US012588021B2

(12) United States Patent
Maamari et al.

(10) Patent No.: US 12,588,021 B2
(45) Date of Patent: Mar. 24, 2026

(54) CAPABILITY INFORMATION SIGNALING FOR DYNAMIC INDICATION OF SHARED CHANNEL OCCASION SKIPPING

(71) Applicant: QUALCOMM Incorporated, San Diego, CA (US)

(72) Inventors: Diana Maamari, San Diego, CA (US); Ahmed Elshafie, San Diego, CA (US); Huilin Xu, Temecula, CA (US); Mostafa Khoshnevisan, San Diego, CA (US); Mickael Mondet, Louannec (FR); Iyab Issam Sakhnini, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/194,305

(22) Filed: Mar. 31, 2023

(65) Prior Publication Data

US 2024/0334426 A1 Oct. 3, 2024

(51) Int. Cl.
*H04W 8/22* (2009.01)
*H04W 72/1268* (2023.01)
*H04W 72/51* (2023.01)

(52) U.S. Cl.
CPC ....... *H04W 72/1268* (2013.01); *H04W 72/51* (2023.01)

(58) Field of Classification Search
CPC .. H04W 72/1268; H04W 72/23; H04W 72/51
See application file for complete search history.

(56) References Cited

U.S. PATENT DOCUMENTS

| | | | | |
|---|---|---|---|---|
| 12,289,700 | B2 * | 4/2025 | Takeda | H04W 72/23 |
| 2018/0070367 | A1 * | 3/2018 | Fujishiro | H04W 52/0216 |
| 2019/0116490 | A1 * | 4/2019 | Chang | H04W 72/1268 |
| 2020/0053793 | A1 * | 2/2020 | Loehr | H04W 74/0808 |
| 2020/0068562 | A1 * | 2/2020 | Wu | H04L 1/0068 |
| 2023/0022915 | A1 * | 1/2023 | Bhamri | H04B 7/0408 |

* cited by examiner

*Primary Examiner* — Phuc H Tran
(74) *Attorney, Agent, or Firm* — Holland & Hart LLP

(57) ABSTRACT
Methods, systems, and devices for wireless communications are described. A user equipment (UE) may transmit a capability information message indicating a timeline prior to a physical uplink shared channel (PUSCH) occasion that the UE may be capable of transmitting a PUSCH skipping indication. The PUSCH skipping indication may indicate that the UE may skip uplink transmission in at least one PUSCH occasion. In some cases, the UE may receive signaling indicating that the UE is scheduled with one or more PUSCH occasions. The UE may transmit, at least at the indicated timeline to a first PUSCH occasion, a control message including the PUSCH skipping indication.

30 Claims, 17 Drawing Sheets

Skipped PUSCH
Occasions

200

510

520

515

505

500

Communications Manager

Capability Component

625

Receiver

610

Scheduling Component

630

Transmitter

615

Skipping Component

635

620

605

600

130    105    115

Network
Entity

Transceiver

1210

Antenna

1215

Communications
Manager

1220

Memory

Code

1230

1225

1240

Processor

1235

1205

1200

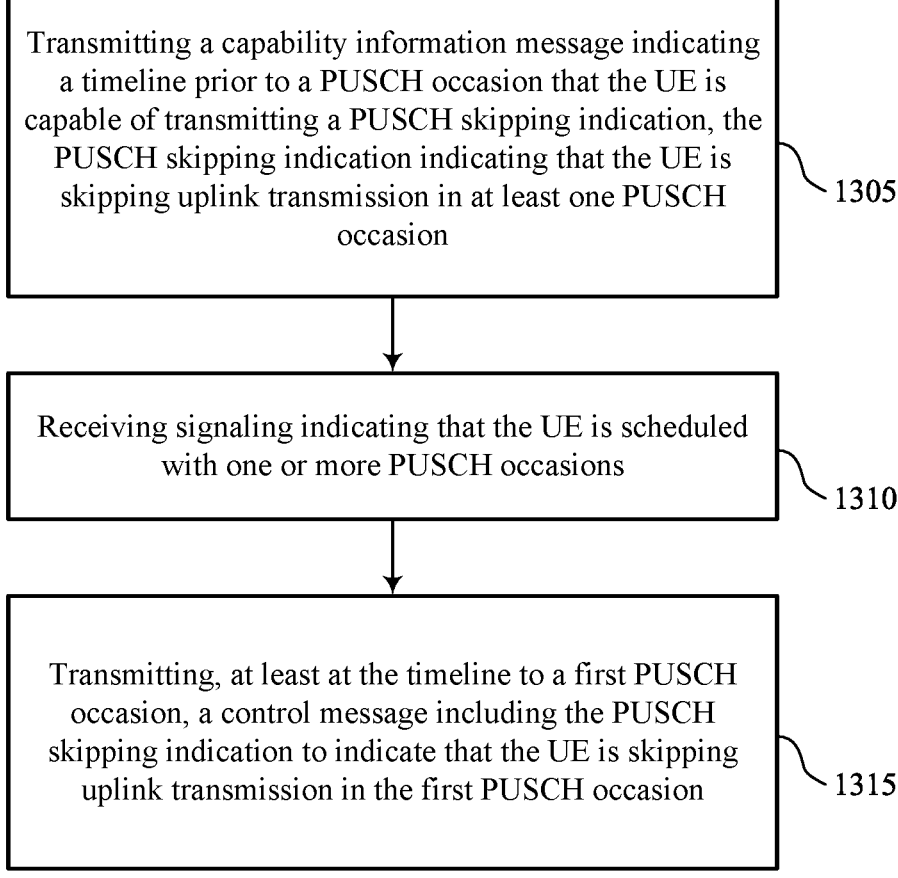

Transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion

1305

Receiving signaling indicating that the UE is scheduled with one or more PUSCH occasions

1310

Transmitting, at least at the timeline to a first PUSCH occasion, a control message including the PUSCH skipping indication to indicate that the UE is skipping uplink transmission in the first PUSCH occasion

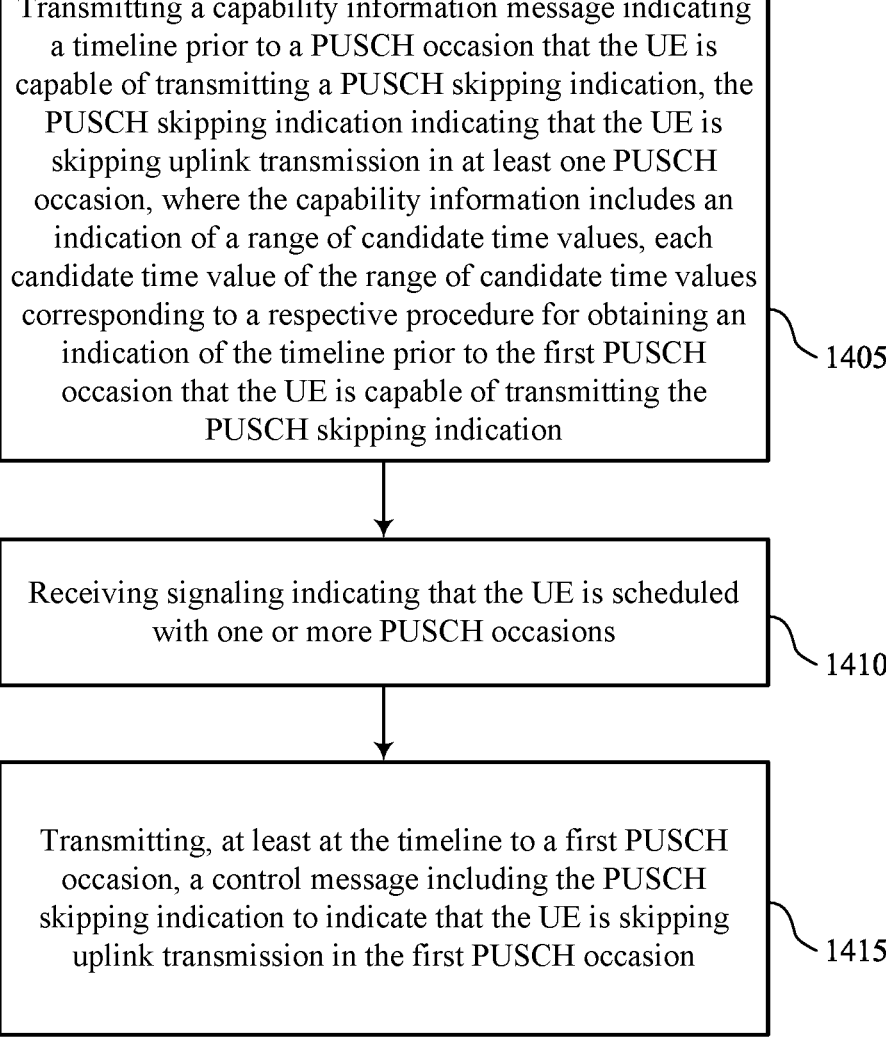

Transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, where the capability information includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication

1405

Receiving signaling indicating that the UE is scheduled with one or more PUSCH occasions

1410

Transmitting, at least at the timeline to a first PUSCH occasion, a control message including the PUSCH skipping indication to indicate that the UE is skipping uplink transmission in the first PUSCH occasion

Figure 15:
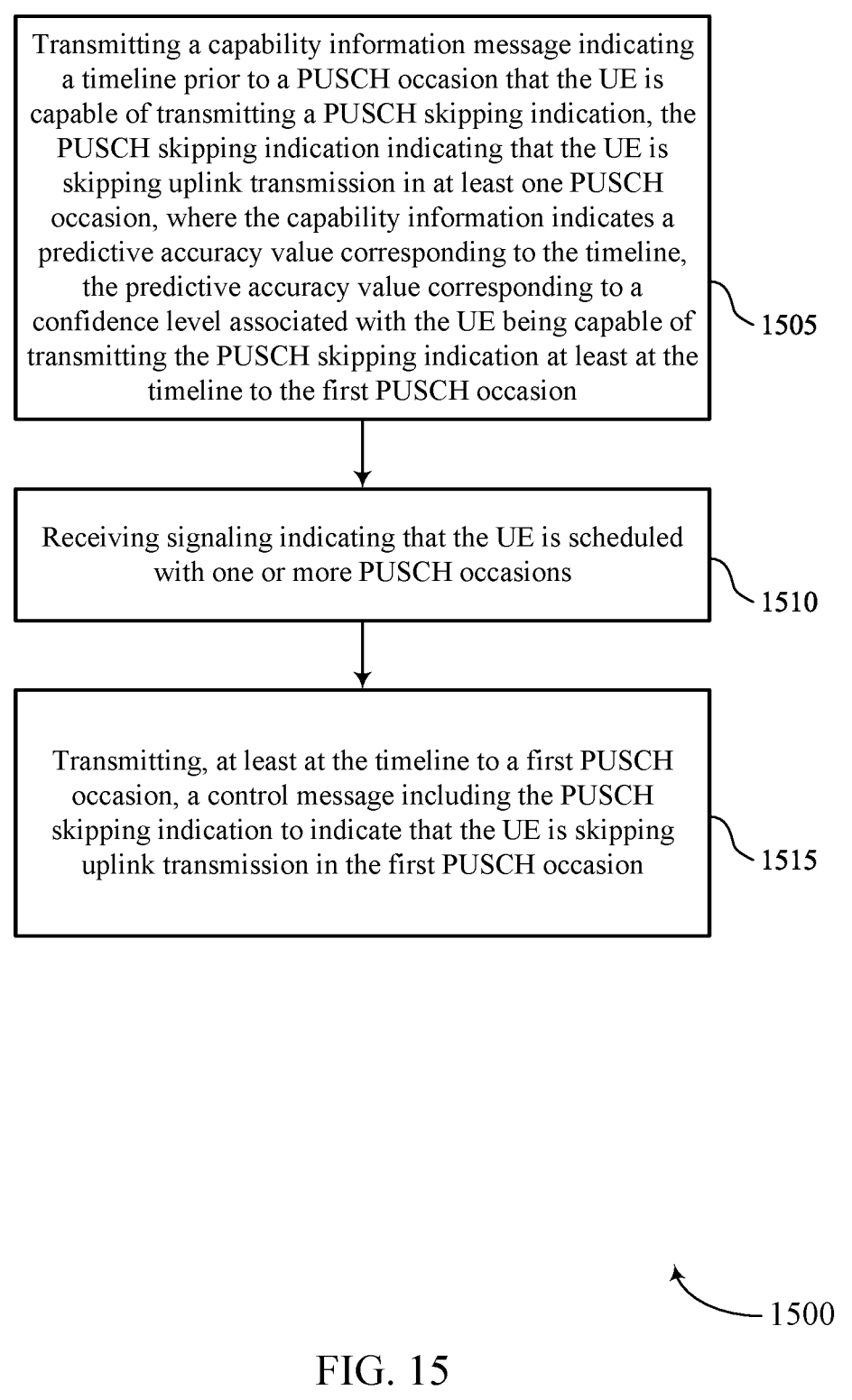

Transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, where the capability information indicates a predictive accuracy value corresponding to the timeline, the predictive accuracy value corresponding to a confidence level associated with the UE being capable of transmitting the PUSCH skipping indication at least at the timeline to the first PUSCH occasion

1505

Receiving signaling indicating that the UE is scheduled with one or more PUSCH occasions

1510

Transmitting, at least at the timeline to a first PUSCH occasion, a control message including the PUSCH skipping indication to indicate that the UE is skipping uplink transmission in the first PUSCH occasion

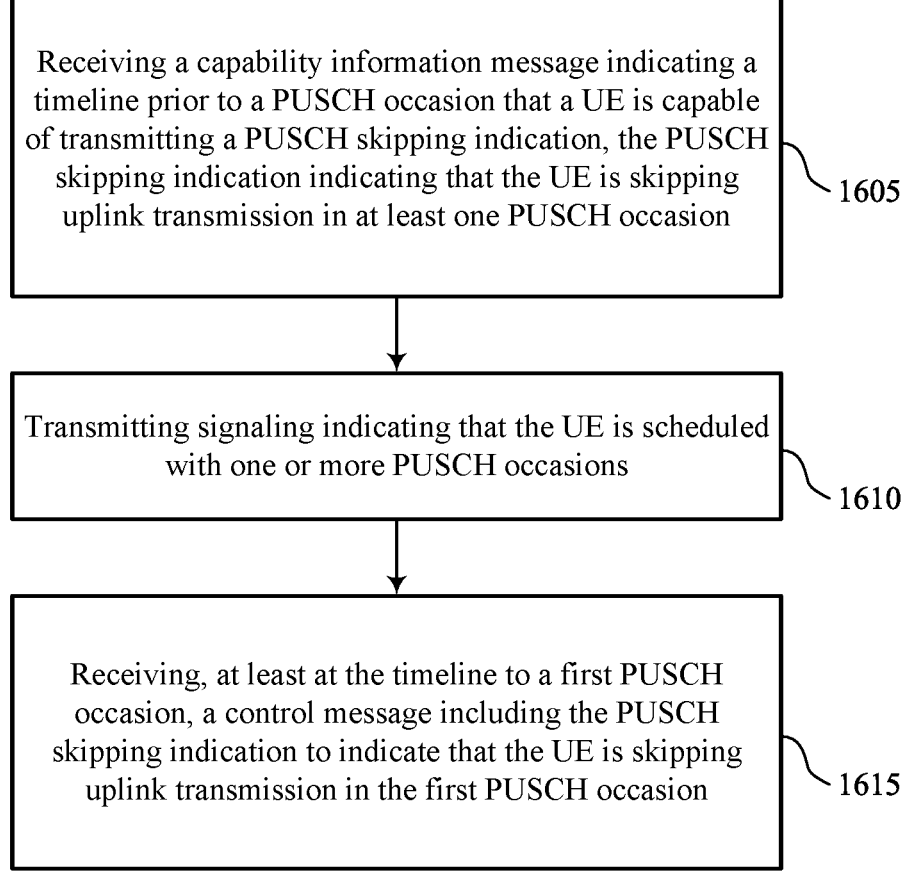

Receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion

1605

Transmitting signaling indicating that the UE is scheduled with one or more PUSCH occasions

1610

Receiving, at least at the timeline to a first PUSCH occasion, a control message including the PUSCH skipping indication to indicate that the UE is skipping uplink transmission in the first PUSCH occasion

Figure 17:
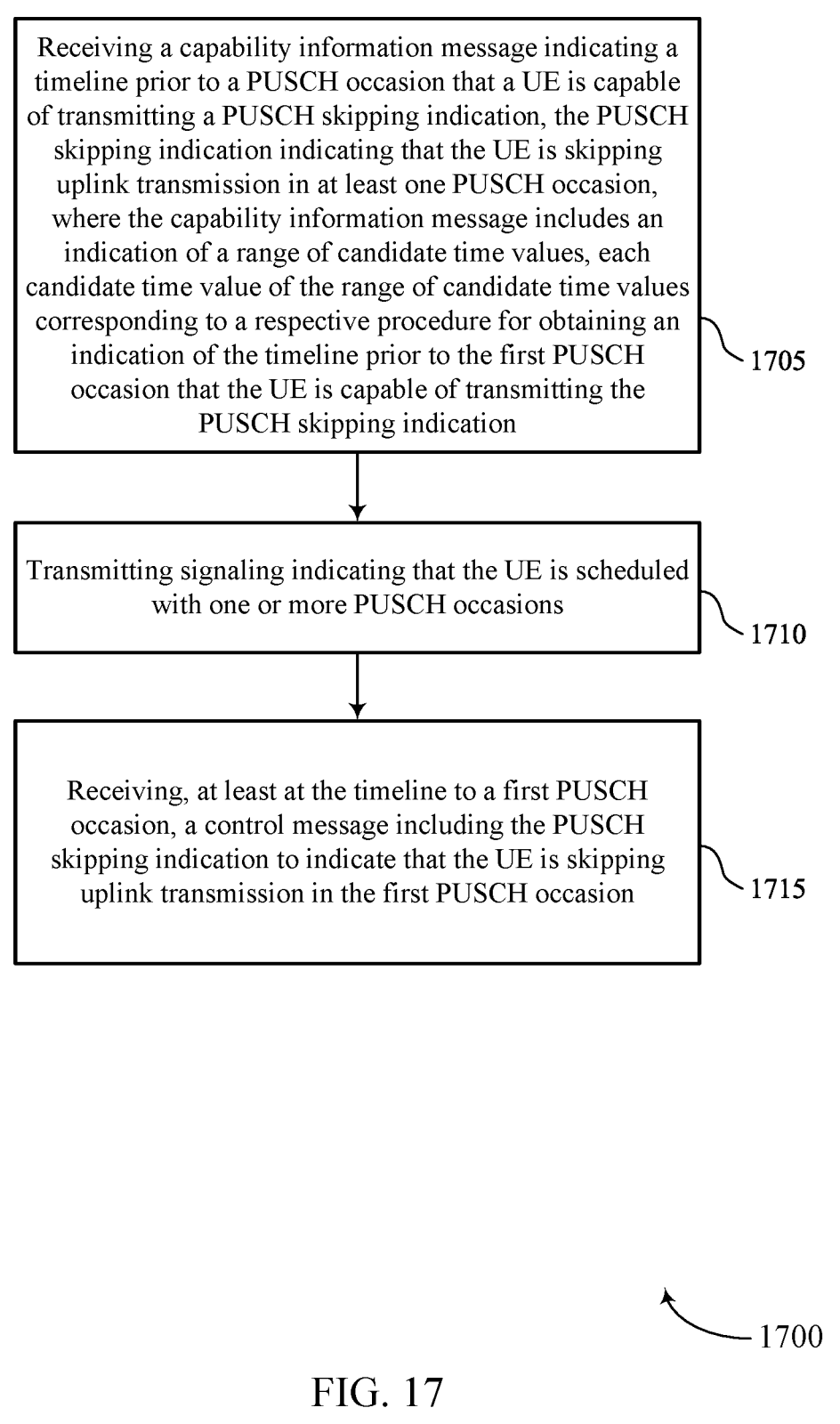

Receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion, where the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication

1705

Transmitting signaling indicating that the UE is scheduled with one or more PUSCH occasions

1710

Receiving, at least at the timeline to a first PUSCH occasion, a control message including the PUSCH skipping indication to indicate that the UE is skipping uplink transmission in the first PUSCH occasion

CAPABILITY INFORMATION SIGNALING FOR DYNAMIC INDICATION OF SHARED CHANNEL OCCASION SKIPPING

FIELD OF TECHNOLOGY

The following relates to wireless communications, including capability information signaling for dynamic indication of shared channel occasion skipping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some wireless communications systems, a network entity may schedule a UE with one or more physical uplink shared channel (PUSCH) occasions. The UE may determine not to use one or more of the PUSCH occasions and may skip the one or more PUSCH occasions.

SUMMARY

The described techniques relate to improved methods, systems, devices, and apparatuses that support capability information signaling for dynamic indication of shared channel occasion skipping. For example, the described techniques provide for a user equipment (UE) transmitting capability signaling to a network entity indicating timing information (e.g., a timeline) corresponding to an amount of time prior to a physical uplink shared channel (PUSCH) occasion that the UE is capable of indicating skipping for the PUSCH occasion. For example, the UE may indicate a minimum amount of time or a threshold amount of time prior to the PUSCH occasion that the UE will indicate the skipping indication. A network entity may schedule the UE with one or more PUSCH occasions, and the UE may transmit the skipping indication in accordance with the timeline.

A method for wireless communications at a UE is described. The method may include transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, receiving signaling indicating that the UE is scheduled with one or more PUSCH occasions, and transmitting, at least at the timeline to a first PUSCH occasion, a control message including the PUSCH skipping indication to indicate that the UE is skipping uplink transmission in the first PUSCH occasion.

An apparatus for wireless communications at a UE is described. The apparatus may include a processor, memory coupled with the processor, and instructions stored in the memory. The instructions may be executable by the processor to cause the apparatus to transmit a capability information message indicating a timeline prior to a PUSCH occasion that the UE is capable of transmitting a PUSCH skipping indication, the PUSCH skipping indication indicating that the UE is skipping uplink transmission in at least one PUSCH occasion, receive signaling indicating that the UE is scheduled with one or more PUSCH occasions, and transmit, at least at the timeline to a first PUSCH occasion, a control message including the PUSCH skipping indication to indicate that the UE is skipping uplink transmission in the first PUSCH occasion.

Another apparatus for wireless communications at a UE is described. The apparatus may include means for transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, means for receiving signaling indicating that the UE is scheduled with one or more PUSCH occasions, and means for transmitting, at least at the timeline to a first PUSCH occasion, a control message including the PUSCH skipping indication to indicate that the UE is skipping uplink transmission in the first PUSCH occasion.

A non-transitory computer-readable medium storing code for wireless communications at a UE is described. The code may include instructions executable by a processor to transmit a capability information message indicating a timeline prior to a PUSCH occasion that the UE is capable of transmitting a PUSCH skipping indication, the PUSCH skipping indication indicating that the UE is skipping uplink transmission in at least one PUSCH occasion, receive signaling indicating that the UE is scheduled with one or more PUSCH occasions, and transmit, at least at the timeline to a first PUSCH occasion, a control message including the PUSCH skipping indication to indicate that the UE is skipping uplink transmission in the first PUSCH occasion.

In some examples of the method, apparatuses, and non-transitory computer-readable medium described herein, the capability information message includes an indication of a range of candidate time values, each candidate time value of the range of candidate time values corresponding to a respective procedure for obtaining an indication of the timeline prior to the first PUSCH occasion that the UE may be capable of transmitting the PUSCH skipping indication.

In some examples of the method, apparatuses, and non-transitory computer-readable medium described herein, the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

Some examples of the method, apparatuses, and non-transitory computer-readable medium described herein may further include operations, features, means, or instructions for receiving control signaling including an indication of a set of predictive accuracy values including the predictive accuracy value, a set of candidate time values, or both, where the predictive accuracy value may be based on receiving the control signaling.

In some examples of the method, apparatuses, and non-transitory computer-readable medium described herein, the capability information message includes an indication that the UE may be capable of obtaining one or more types of uplink traffic information, where the timeline may be based on at least one of the one or more types of uplink traffic information.

Some examples of the method, apparatuses, and non-transitory computer-readable medium described herein may further include operations, features, means, or instructions for receiving control signaling indicating that skipping uplink transmission in at least the PUSCH occasion may be enabled.

Some examples of the method, apparatuses, and non-transitory computer-readable medium described herein may further include operations, features, means, or instructions for transmitting a capability information update message indicating a second timeline different from the timeline and transmitting a second control message, at least at the second timeline to a second PUSCH occasion and based on the control signaling indicating that skipping uplink transmission in at least the PUSCH occasion may be enabled, indicating that the UE will skip the second PUSCH occasion.

Some examples of the method, apparatuses, and non-transitory computer-readable medium described herein may further include operations, features, means, or instructions for receiving control signaling including an indication of a second timeline prior to the PUSCH occasion that a network entity may be capable of reallocating the PUSCH occasion, where the capability information message includes an indication that the timeline satisfies the second timeline.

Some examples of the method, apparatuses, and non-transitory computer-readable medium described herein may further include operations, features, means, or instructions for receiving a request message from a network entity for the timeline, where the capability information message may be based on receiving the request message.

Some examples of the method, apparatuses, and non-transitory computer-readable medium described herein may further include operations, features, means, or instructions for receiving control signaling indicating a list of configured grants (CGs), each CG of the list of CGs including one or more PUSCH occasions and each CG of the list of CGs corresponding to a respective traffic flow of a set of multiple traffic flows, where the capability information message indicates a set of timelines including the timeline, each timeline of the set of timelines corresponding to one or more CGs of the list of CGs.

In some examples of the method, apparatuses, and non-transitory computer-readable medium described herein, the capability information message includes an indication that the UE supports a feature of a feature group corresponding to the timeline.

In some examples of the method, apparatuses, and non-transitory computer-readable medium described herein, the control message includes an indication of a skipping state corresponding to each of a set of multiple PUSCH occasions including the PUSCH occasion, the indication of the skipping state including an indication that a second PUSCH occasion may be skipped, the second PUSCH occasion may be not skipped, or that a skipping status of the second PUSCH occasion may be unknown.

In some examples of the method, apparatuses, and non-transitory computer-readable medium described herein, the control message includes an indication of a time period during which the UE will skip one or more PUSCH occasions including the first PUSCH occasion.

In some examples of the method, apparatuses, and non-transitory computer-readable medium described herein, the capability information message includes an indication that the UE supports PUSCH skipping in a multi-transmission reception point (mTRP) deployment.

A method for wireless communications at a network entity is described. The method may include receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion, transmitting signaling indicating that the UE is scheduled with one or more PUSCH occasions, and receiving, at least at the timeline to a first PUSCH occasion, a control message including the PUSCH skipping indication to indicate that the UE is skipping uplink transmission in the first PUSCH occasion.

An apparatus for wireless communications at a network entity is described. The apparatus may include a processor, memory coupled with the processor, and instructions stored in the memory. The instructions may be executable by the processor to cause the apparatus to receive a capability information message indicating a timeline prior to a PUSCH occasion that a UE is capable of transmitting a PUSCH skipping indication, the PUSCH skipping indication indicating that the UE is skipping uplink transmission in at least one PUSCH occasion, transmit signaling indicating that the UE is scheduled with one or more PUSCH occasions, and receive, at least at the timeline to a first PUSCH occasion, a control message including the PUSCH skipping indication to indicate that the UE is skipping uplink transmission in the first PUSCH occasion.

Another apparatus for wireless communications at a network entity is described. The apparatus may include means for receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion, means for transmitting signaling indicating that the UE is scheduled with one or more PUSCH occasions, and means for receiving, at least at the timeline to a first PUSCH occasion, a control message including the PUSCH skipping indication to indicate that the UE is skipping uplink transmission in the first PUSCH occasion.

A non-transitory computer-readable medium storing code for wireless communications at a network entity is described. The code may include instructions executable by a processor to receive a capability information message indicating a timeline prior to a PUSCH occasion that a UE is capable of transmitting a PUSCH skipping indication, the PUSCH skipping indication indicating that the UE is skipping uplink transmission in at least one PUSCH occasion, transmit signaling indicating that the UE is scheduled with one or more PUSCH occasions, and receive, at least at the timeline to a first PUSCH occasion, a control message including the PUSCH skipping indication to indicate that the UE is skipping uplink transmission in the first PUSCH occasion.

In some examples of the method, apparatuses, and non-transitory computer-readable medium described herein, the capability information message includes an indication of a range of candidate time values, each candidate time value of the range of candidate time values corresponding to a respective procedure for obtaining an indication of the timeline prior to the first PUSCH occasion that the UE may be capable of transmitting the PUSCH skipping indication.

In some examples of the method, apparatuses, and non-transitory computer-readable medium described herein, the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

Some examples of the method, apparatuses, and non-transitory computer-readable medium described herein may further include operations, features, means, or instructions for transmitting control signaling including an indication of a set of predictive accuracy values including the predictive accuracy value, a set of candidate time values, or both, where the predictive accuracy value may be based on transmitting the control signaling.

In some examples of the method, apparatuses, and non-transitory computer-readable medium described herein, the capability information message includes an indication that the UE may be capable of obtaining one or more types of uplink traffic information, where the timeline may be based on at least one of the one or more types of uplink traffic information.

Some examples of the method, apparatuses, and non-transitory computer-readable medium described herein may further include operations, features, means, or instructions for transmitting control signaling indicating that skipping uplink transmission in at least the PUSCH occasion may be enabled.

Some examples of the method, apparatuses, and non-transitory computer-readable medium described herein may further include operations, features, means, or instructions for receiving a capability information update message indicating a second timeline different from the timeline and receiving a second control message, at least at the second timeline to a second PUSCH occasion and based on the control signaling indicating that skipping uplink transmission in at least the PUSCH occasion may be enabled, indicating that the UE will skip the second PUSCH occasion.

Some examples of the method, apparatuses, and non-transitory computer-readable medium described herein may further include operations, features, means, or instructions for transmitting control signaling including an indication of a second timeline prior to the PUSCH occasion that the network entity may be capable of reallocating the PUSCH occasion, where the capability information message includes an indication that the timeline satisfies the second timeline.

Some examples of the method, apparatuses, and non-transitory computer-readable medium described herein may further include operations, features, means, or instructions for transmitting a request message to the UE for the timeline, where the capability information message may be based on transmitting the request message.

Some examples of the method, apparatuses, and non-transitory computer-readable medium described herein may further include operations, features, means, or instructions for transmitting control signaling indicating a list of CGs, each CG of the list of CGs including one or more PUSCH occasions and each CG of the list of CGs corresponding to a respective traffic flow of a set of multiple traffic flows, where the capability information message indicates a set of timelines including the timeline, each timeline of the set of timelines corresponding to one or more CGs of the list of CGs.

In some examples of the method, apparatuses, and non-transitory computer-readable medium described herein, the capability information message includes an indication that the UE supports a feature of a feature group corresponding to the timeline.

In some examples of the method, apparatuses, and non-transitory computer-readable medium described herein, the control message includes an indication of a skipping state corresponding to each of a set of multiple PUSCH occasions including the PUSCH occasion, the indication of the skipping state including an indication that a second PUSCH occasion may be skipped, the second PUSCH occasion may be not skipped, or that a skipping status of the second PUSCH occasion may be unknown.

In some examples of the method, apparatuses, and non-transitory computer-readable medium described herein, the control message includes an indication of a time period during which the UE will skip one or more PUSCH occasions including the first PUSCH occasion.

In some examples of the method, apparatuses, and non-transitory computer-readable medium described herein, the capability information message includes an indication that the UE supports PUSCH skipping in a mTRP deployment.

7

Figure 12:

FIG. 12 shows a diagram of a system including a device that supports capability information signaling for dynamic indication of shared channel occasion skipping in accordance with one or more aspects of the present disclosure.

FIGS. 13 through 17 show flowcharts illustrating methods that support capability information signaling for dynamic indication of shared channel occasion skipping in accordance with one or more aspects of the present disclosure.

DETAILED DESCRIPTION

In some wireless communications systems, a UE may be configured with a configured grant (CG) including multiple physical uplink shared channel (PUSCH) occasions (e.g., CG-PUSCH occasions). In some cases, the UE may not use one or more of the multiple PUSCH occasions and instead may skip the one or more PUSCH occasions. In such cases, the UE may indicate the PUSCH skipping to a network entity. However, in some examples, the network entity may be unable to reallocate the unused resources (e.g., the unused PUSCH) to another UE if the network entity does not receive the skipping indication with enough time before the skipped PUSCH occasion. Accordingly, the network entity may impose a time constraint where the network entity enables skipping for the PUSCH occasion if the network entity receives a skipping indication from the UE an amount of time prior to the PUSCH occasion to be skipped. However, the time constraint on PUSCH skipping may reduce scheduling flexibility and cause inefficient resource utilization at the UE. For example, different UEs may have different capabilities not considered by the network entity, or capabilities may change over time. The time constraint of the network entity may prevent the UE from skipping PUSCH occasions that the UE would otherwise be capable of skipping due to the UE being unable to satisfy the time constraint of the network entity for PUSCH skipping.

In some examples, a UE may indicate to a network entity a timeline (e.g., a minimum amount of time) prior to the PUSCH occasion that the UE can indicate to the network that the UE will skip the PUSCH occasion. Accordingly, the UE may transmit a skipping indication for the PUSCH occasion that satisfies the indicated timeline. In some cases, the network entity may enable skipping for the PUSCH occasion based on the UE supporting the indicated timeline (e.g., if the indicated timeline satisfies a threshold at the network entity, the network entity may enable the PUSCH skipping). By indicating the timeline, the UE may support efficient resource utilization at the UE and at the network entity. For example, the network entity may reallocate resources of the skipped PUSCH occasion to other UEs or devices because the network entity is aware that the UE will skip the PUSCH occasion. Indicating the timeline may further improve the ability of the network entity to predict and enable PUSCH skipping, which may free resources to perform other wireless communications activities, decreasing resource waste at the network entity associated with the PUSCH occasion being unused, reducing overall system latency, increasing system throughput, and improving user experience.

In some cases, the UE may indicate a range of time thresholds and may indicate different prediction accuracy values corresponding to respective time thresholds in the range, which may support improved resource management at the network entity because the network entity may be able to better predict when a PUSCH occasion will be skipped based on the prediction accuracy at the UE. The time threshold may be based on a capability of the UE to predict channel characteristics, which may support an increased accuracy for prediction in cases where the UE may have more or less capability to predict traffic or packet size information (e.g., for different types of traffic). In some cases, the network entity may indicate a second timeline and the UE may indicate that the timeline of the UE satisfies the second time threshold, which may support increased coordination between the UE and the network entity for indicating and performing PUSCH skipping, decrease system delays and system latency, support additional flexibility and effective implementation of PUSCH skipping, and improve user experience.

Aspects of the disclosure are initially described in the context of wireless communications systems. Aspects of the disclosure are further described in the context of uplink transmission schemes, timing diagrams, and process flows. Aspects of the disclosure are further illustrated by and described with reference to apparatus diagrams, system diagrams, and flowcharts that relate to capability information signaling for dynamic indication of shared channel occasion skipping.

Figure 1:
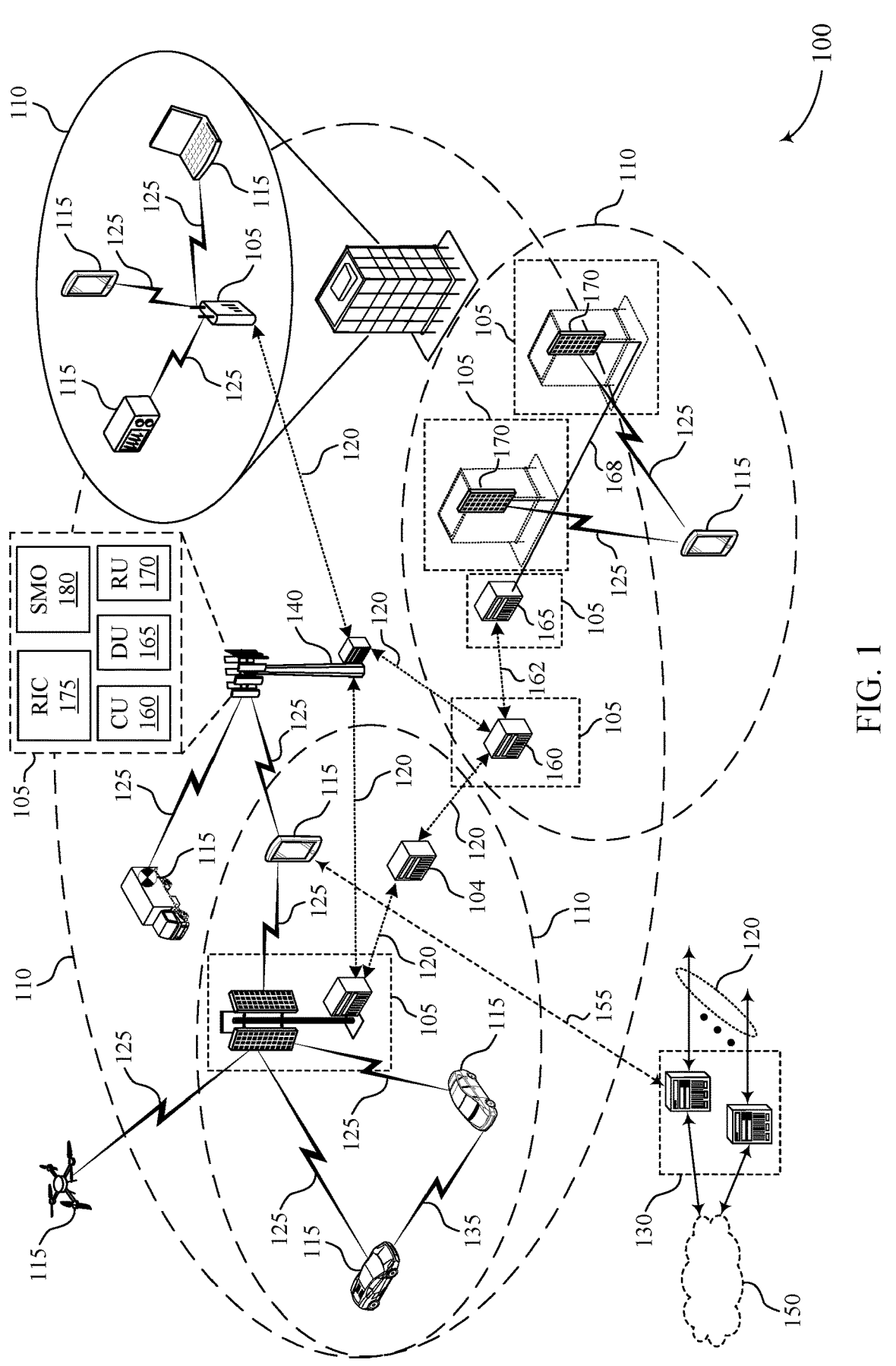
FIG. 1 shows an example of a wireless communications system that supports capability information signaling for dynamic indication of shared channel occasion skipping in accordance with one or more aspects of the present disclosure.

FIG. 1 shows an example of a wireless communications system 100 that supports capability information signaling for dynamic indication of shared channel occasion skipping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support capability information signaling for dynamic indication of shared channel occasion skipping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may transmit a capability information message to a network entity 105 indicating a timeline prior to a PUSCH occasion that the UE 115 may be capable of transmitting a PUSCH skipping indication. The PUSCH skipping indication may indicate that the UE 115 may skip uplink transmission in at least one PUSCH occasion. In some cases, the UE may receive signaling indicating that the UE is scheduled with one or more PUSCH occasions. The UE may transmit, at least at the indicated timeline to a first PUSCH occasion, a control message including the PUSCH skipping indication.

Figure 2:
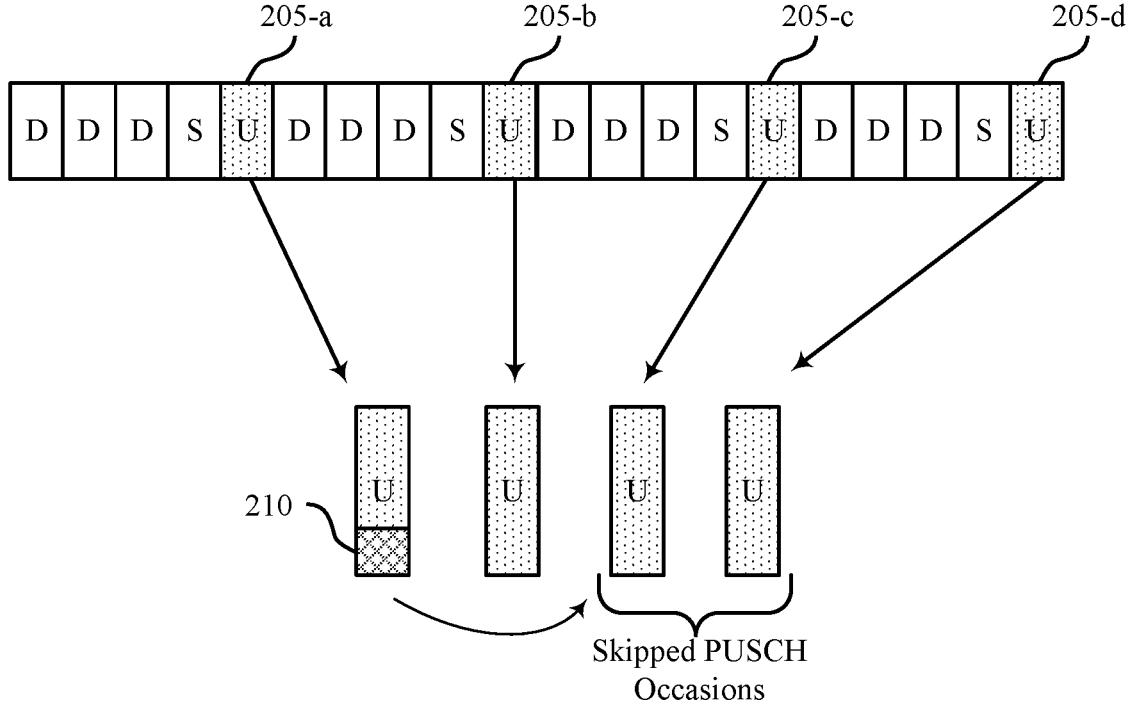
FIG. 2 shows an example of an uplink transmission scheme that supports capability information signaling for dynamic indication of shared channel occasion skipping in accordance with one or more aspects of the present disclosure.
Figure 2:

FIG. 2 shows an example of an uplink transmission scheme 200 that supports capability information signaling for dynamic indication of shared channel occasion skipping in accordance with one or more aspects of the present disclosure. The uplink transmission scheme 200 may implement aspects of or may be implemented by aspects of the wireless communications system 100. For example, the uplink transmission scheme 200 may be implemented by a UE 115 and a network entity 105, which may be examples of the corresponding devices as described with reference to FIG. 1.

The network entity 105 may configure the UE 115 with one or more PUSCH occasions 205 (e.g., in one or more CG groups). The network entity 105 may further configure the UE 115 with a transmission pattern including one or more uplink (e.g., U) slots, one or more downlink (e.g., D) slots, one or more flexible or special (S) slots, or a combination thereof. For instance, the UE 115 may be configured with a repeating pattern, such as DDDSU. In some examples, a CG group may include one or more slots allocated to a UE 115 for uplink transmissions (e.g., one or more UE slots allocated to the UE for transmitting any pending uplink traffic, without the need for additional dynamic grants, which may increase signaling overhead). The one or more slots may include PUSCH occasions 205 (e.g., CG-PUSCH occasions)

configured for uplink transmissions (e.g., PUSCH transmissions). For example, the UE 115 may receive, from a network entity 105, a configuration of a CG group with four PUSCH occasions 205 (e.g., a PUSCH occasion 205-a, a PUSCH occasion 205-b, a PUSCH occasion 205-c, and a PUSCH occasion 205-d). The UE may utilize the PUSCH occasions 205 for transmitting pending uplink traffic. The CG group may support multiple CG PUSCH transmission occasions in a period of a single CG PUSCH configuration.

In some examples, to avoid resource waste, the UE 115 and the network entity may support a mechanism for reallocating unused CG resources within a given CG period. The UE 115 may support a dynamic indication of unused CG PUSCH occasions (e.g., PUSCH occasions 205) based on an uplink control information (UCI) message (e.g., a CG-UCI, or another UCI). The UE 115 may determine a quantity of PUSCH occasions 205 needed for a transmission (e.g., one or more video frames for uplink extended reality (XR)). That is, based on a size of the transmission (e.g., a video frame size of the video frame), the UE 115 may determine a quantity or duration of PUSCH occasions 205 needed for the transmission. Therefore, to avoid wasted resources, the UE 115 may indicate PUSCH occasions 205 which are not needed for the transmission to the network entity 105 so that they may be reallocated. For example, when an uplink packet (e.g., an uplink XR video frame) arrives for transmission, the UE 115 may use the video frame size to determine a quantity of PUSCH resources (e.g., a quantity of PUSCH occasions 205) the UE 115 will use to transmit the video frame. The UE 115 may also be able to determine the size of one or more video frames for one or more subsequent resources (e.g., a second PUSCH resource or second PUSCH occasion 205). The UE 115 may transmit, in an uplink control message 210 (e.g., a UCI or a MAC-control element (MAC-CE)), an indication of the unused (e.g., unneeded) PUSCH occasions 205.

In the example of FIG. 2, the UE 115 may determine that, based on an amount of pending uplink traffic (e.g., a quantity or size of one or more video frames), the UE 115 has sufficient uplink data to transmit via two PUSCH occasions 205 (e.g., the PUSCH occasion 205-a and the PUSCH occasion 205-b), but that the UE 115 does not have sufficient data to transmit via one or more additional PUSCH occasions 205 (e.g., the PUSCH occasion 205-c and the PUSCH occasion 205-d). PUSCH occasion 205-c and the PUSCH occasion 205-d would therefore remain unoccupied by uplink transmissions by the UE 115, resulting in inefficient use of available system resources. In such examples, the UE 115 may transmit, via an uplink control message 210 during the PUSCH occasion 205-a, a message (e.g., an indicator) indicating that the UE 115 may skip one or more PUSCH occasions 205 (e.g., may skip transmitting during the PUSCH occasion 205-c and the PUSCH occasion 205-d). In some examples, the UE 115 may indicate a different quantity of PUSCH occasions 205 during which the UE 115 may skip transmitting. In some examples, the UE 115 may transmit the uplink control message during a different PUSCH occasion 205 (e.g., during the PUSCH occasion 205-b). Based on the indication that the UE 115 will skip one or more PUSCH occasions 205, the network entity 105-a may more efficiently utilize available system resources (e.g., may reallocate the PUSCH occasion 205-c and the PUSCH occasion 205-d for communications with one or more additional devices, instead of leaving the PUSCH occasion 205-c and the PUSCH occasion 205-d unoccupied).

In some examples, the UE 115 may skip a duration of PUSCH occasions 205 according to the indication starting on a PUSCH occasion 205 directly following the PUSCH occasion 205-a carrying the uplink control message 210. That is, the UE 115 may transmit on the PUSCH occasion 205-a and skip the PUSCH occasion 205-b, the PUSCH occasion 205-c, and the PUSCH occasion 205-d. In some examples, the UE 115 may skip the duration of PUSCH occasions 205 corresponding to the indication starting on a PUSCH occasion 205 after a delay following the PUSCH occasion 205-a carrying the uplink control message 210 (e.g., a preconfigured quantity of PUSCH occasions 205 after the PUSCH occasion 205-a carrying the uplink control message 210). That is, the UE 115 may transmit on the PUSCH occasion 205-a and, for example, the PUSCH occasion 205-b, and may skip the PUSCH occasion 205-c and the PUSCH occasion 205-d. The duration may be, for example, a preconfigured time duration or quantity of intervals (e.g., a quantity of symbols, or slots, among other examples). In some examples, the duration may be a quantity of PUSCH occasions 205. In some examples, the duration may be one of multiple possible durations indicated from a bitmap (e.g., a bitmap configured via RRC signaling).

In some examples, the network entity 105 may determine a minimum time, or a time threshold, from reception of the uplink control message 210 to the PUSCH occasion 205-c, such that the network entity 105 may use the skipping indication to schedule the resources for another UE. The network entity 105 may indicate a timeline for the skipping indication, which may improve capacity at the network entity or support more efficient resource utilization at the network entity 105. However, such a timeline may cause inefficiencies at the UE 115 and may increase implementation complexity at the UE. In some cases, an application or a UE 115 may not know a packet data unit (PDU) set size until the last PDU of the set is generated. In such cases, a number of PUSCH occasions that may be unused (e.g., saved, recycled, reallocated to another UE) may be based on when the last PDU arrives in a buffer of the UE.

In some examples, once a modem knows the PDU set size, the UE may signal which PUSCH occasions the UE will not use. Accordingly, the earlier the modem knows the PDU set size, the earlier the UE may signal the unused PUSCH occasions. For example, the UE may signal the unused PUSCH occasions before the UE transmits a first PUSCH occasion. However, some application layers may be unable to support knowing or communicating the PDU set size before the UE transmits the first PUSCH occasion. In some cases, video encoders may send packets before generating all the packets of a burst. Thus, the UE or the application may be unable to determine the total size of the burst prior to the UE transmitting the first PUSCH occasion of the burst.

In some cases, the UE 115 may indicate, via a capability or UE assistance information, whether the UE 115 is able to predict traffic packet information (e.g., packet size, other traffic packet information). The UE 115 may also indicate whether the UE 115 is uplink XR aware, whether the UE 115 can obtain traffic packet information through a cross-layer application programming interface (API), how soon the UE 115 can provide the traffic packet information before indicating a skipping indication (e.g., via the uplink control message 210), or any combination thereof. For example, the capability information or UE assistance information may indicate a timeline prior to a PUSCH occasion (e.g., CG-PUSCH occasion) that the UE 115 is capable of transmitting the skipping indication. The timeline may include a threshold time, a minimum amount of time, a maximum amount of time, a time range, a time period, a time duration, a time estimate, a predicted amount of time, a statistic of a time value, or any combination thereof. The timeline may be defined in terms of a quantity of time intervals (e.g., a quantity of symbols, a quantity of slots, among other examples), an amount of time (e.g., a quantity of microseconds, among other examples), a quantity of occasions (e.g., CG occasions or PUSCH occasions, among other examples), or any combination thereof.

In some cases, based on the UE 115 providing the traffic packet information, the skipping indication may indicate PUSCH skipping across multiple PUSCH occasions of a single CG. The network entity may enable or disable PUSCH skipping for the UE 115 based on the reported capability or UE assistance information. In some examples, the UE 115 may determine to selectively skip some logical channels based on an allowedCGList. For example, the UE may have a capability to predict uplink traffic characteristics or traffic packet information for some, but not all, uplink traffic flows, and the UE may indicate the capability to the network entity. Additionally, or alternatively, the UE 115 may indicate a capability for skipping (e.g., PDSCH skipping) for multiple transmission and reception point deployments.

Figure 3:
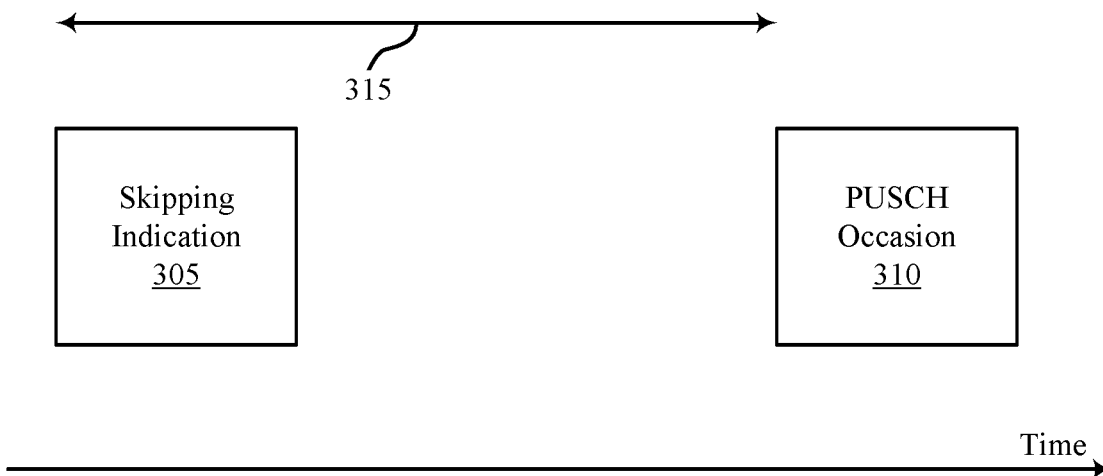
FIG. 3 shows an example of a timing diagram that supports capability information signaling for dynamic indication of shared channel occasion skipping in accordance with one or more aspects of the present disclosure.

FIG. 3 shows an example of a timing diagram 300 that supports capability information signaling for dynamic indication of shared channel occasion skipping in accordance with one or more aspects of the present disclosure. The timing diagram 300 may implement aspects or may be implemented by aspects of the wireless communications system 100 or the configured uplink transmission scheme 200. For example, the timing diagram 300 may be implemented by a UE 115 and a network entity 105, which may be examples of the corresponding devices as described with reference to FIG. 1.

In some examples, a UE 115 may be capable of predicting uplink skipping, and the UE 115 may transmit a skipping indication 305 to a network entity 105 to indicate that the UE 115 is skipping a PUSCH occasion 310. The UE 115 may indicate in a UE capability message whether the UE 115 can estimate traffic characteristics. Additionally, or alternatively, the UE 115 may indicate, via the UE capability message and prior to a first PUSCH occasion 310 of one or more PUSCH occasions, how readily the UE 115 can obtain burst or packet size information, which the UE 115 may use to determine how many of the one or more PUSCH occasions (e.g., CG-PUSCH occasions) the UE will use. For example, the UE may indicate, via the skipping indication 305, how many of the one or more PUSCH occasions the UE will use, how many of the one or more PUSCH occasions the UE will skip, or both, at a threshold duration 315 (e.g., Tmin) from (e.g., prior to) the first PUSCH occasion 310 of the one or more PUSCH occasions. The UE capability message may be transmitted prior to the skipping indication 305 and may indicate the duration 315.

The duration 315 may have a range and may be dynamic (e.g., not static). A first UE that supports a longer duration 315 may be more capable than a second UE that supports a shorter duration 315 because the first UE may be capable of providing the skipping indication 305 earlier than the second UE. In some examples, an accuracy measure of the duration 315 may vary (e.g., based on how the UE 115 obtains traffic information). The range of the duration 315 may also vary based on how the UE 115 obtains the traffic information. In some cases, the UE 115 may not report the UE capability (e.g., the duration 315) because the UE 115 is unable to predict packet availability for the future. In such cases, the network entity 105 may assume that the duration 315 is zero.

The UE 115 may predict traffic, or otherwise obtain traffic information, using various mechanisms. The mechanisms for predicting traffic or obtaining traffic information may include a cross layer API from an application layer to a modem, estimation of uplink traffic through artificial intelligence (AI) or machine learning (ML), XR awareness in uplink from the application layer, or any combination thereof. XR awareness in the uplink may be based on an application (e.g., an application of the application layer). In some examples, XR awareness in downlink is established to provide PDU set information in a general packet radio service (GPRS) tunneling protocol unit (GTP-U) header. Accordingly, in some examples, a UE may establish XR awareness in the uplink (e.g., for uplink transmissions).

In some examples, one or more time thresholds (e.g., T0, T1) may be defined that relate to the accuracy of the duration 315, or to the accuracy of candidate time values (e.g., in a range) for the duration 315. Tmin may be the duration 315, and the UE 115 may indicate a probability, or prediction accuracy, for a value (e.g., candidate time value) of Tmin based on the value of Tmin satisfying the one or more time thresholds (e.g., T0, T1). For example, the UE 115 or the network entity 105 may indicate that if Tmin<T0, the prediction for uplink skipping may be 100% accurate, or may indicate that if T0<=Tmin<=T1, the prediction for uplink skipping may be 90% accurate.

The probabilities (e.g., 100%, 90%, 70%) may be fixed and the UE 115 may report multiple values (e.g., candidate time values, time thresholds) of Tmin. For example, the UE 115 may be configured with one or more probabilities (e.g., 100%, 90%, 80%, etc.), and the UE 115 may report a Tmin (e.g., time threshold, duration 315) for each probability. In some cases, the UE 115 may indicate that the UE 115 can transmit the skipping indication 305 at least a first amount of time (e.g., Tmin) prior to the PUSCH occasion 310 with 100% accuracy, can transmit the skipping indication 305 at least a second amount of time (e.g., that is smaller than the first amount of time) prior to the PUSCH occasion 310 with a lesser accuracy (e.g., 90%), can transmit the skipping indication 305 at least a third among of time (e.g., that is smaller than the first amount of time and the second amount of time) prior to the PUSCH occasion 310 with an even lesser accuracy (e.g., 80%), etc.

In some examples, the time thresholds, or candidate Tmin values (e.g., 0.5 ms, 1 ms, 2 ms), may be fixed, and the UE 115 may report the prediction accuracy (e.g., probability). For example, the UE 115 may be configured with one or more time thresholds (e.g., 0.5 ms, 1 ms, 2 ms), and the UE 115 may report a probability (e.g., prediction accuracy value) for each time threshold. In some cases, the UE 115 may indicate that the UE 115 can transmit the skipping indication 305 0.5 ms prior to the PUSCH occasion 310 with a first probability, can transmit the skipping indication 305 1 ms prior to the PUSCH occasion 310 with a second probability (e.g., that is greater than the first probability), can transmit the skipping indication 305 2 ms prior to the PUSCH occasion 310 with a third probability (e.g., that is greater than the first probability and the second probability), etc.

In some other examples, the UE 115 may report both the prediction accuracies and the corresponding time thresholds. In some cases, the UE 115 may indicate via the UE capability message whether the UE 115 can obtain uplink traffic information. Uplink traffic information may include PDU set size, burst size, a quantity or size of packets within the burst or within the PDU set, statistics pertaining to the uplink traffic such as minimum, maximum, or mean, or any combination thereof. In some examples, the uplink traffic information may include packet arrival time, uplink jitter (e.g., a range, other statistic pertaining to uplink jitter), a range of time that the UE 115 can obtain uplink traffic information before a skipped uplink occasion, a timeline indicating that the UE can predict within one or more time periods in the future, or any combination thereof. In some cases, the UE 115 may indicate in the UE capability message whether the UE 115 can obtain UL traffic information through any of the above, and, based on this capability, the UE may implicitly or explicitly indicates the UE 115 may utilize the UCI or UCI-CG for skipping over multiple PUSCH occasions of a single CG or across two or more CGs.

The UE 115 may report via the UE capability message statistics of the duration 315 (e.g., Tmin). For example, the UE 115 may report a mean, a variance, a standard deviation, a minimum, a maximum, an expectation of minimum or maximum, a cumulative distribution function, or any combination thereof, of the duration 315. In some examples, the UE 115 may update the duration 315. For example, the UE may indicate via a MAC-CE or UCI a delta difference (e.g., delta update) for updating Tmin (e.g., with reference to a current Tmin) or may update Tmin by indicating a new Tmin. The UE 115 may indicate the update to Tmin via the skipping indication 305 (e.g., UCI-CG) or via a new UCI. In some examples, the network entity 105 may indicate a time threshold (e.g., a minimum time, TgNB), and the UE 115 may indicate whether the duration 315 (e.g., Tmin) is within (e.g., satisfies, does not satisfy) the time threshold of the network entity 105. For example, if Tmin is not sufficient for the network entity 105 to process the UCI in time (e.g., with enough time) to reschedule the PUSCH occasion 310 to another UE, the UE 115 may indicate that the UE will not transmit the skipping indication 305 (e.g., UCI skipping indication), which may free up capacity at the UE. Otherwise, if Tmin is sufficient for the network entity 105 to process the UCI in time to reschedule the PUSCH occasion 310 to another UE, the UE 115 may indicate that it will utilize the UCI (e.g., the skipping indication 305) to indicate skipping of at least one PUSCH occasions.

In some examples, the UE 115 may include the UE capability information message in UE assistance information. The UE may update information included in the UE capability message (e.g., the duration 315, time thresholds, prediction accuracy values, capabilities for uplink traffic information, etc.) via L1, L2, or L3 signaling (e.g., scheduling request (SR), buffer status report (BFR), power headroom report (PHR), random access channel message, HARQ-ACK) or by multiplexing with L1, L2, or L3 signaling. In some cases, the network entity 105 may request information from the UE 115 regarding a capability of the UE 115 (e.g., to predict uplink traffic information, to predict packet size). For example, the network entity 105 can ask for more information (e.g., additional information) regarding the timeline 315. The network entity 105 may request how soon the UE 115 can obtain packet size information before updating skipping information for the PUSCH occasion 310 (e.g., before transmitting the skipping indication 305). Based on feedback from the UE 115, the network entity 105 may enable the skipping indication 305 (e.g., UCI, UCI-CG) for indication of skipping over one or more PUSCH occasions.

The UE 115 may be capable of predicting burst or packet size information for some traffic flows but not others. For example, the UE 115 may be associated with, or may be scheduled to transmit, five uplink traffic flows (e.g., voice, haptic, video, pose, sense). The UE 115 may predict the traffic sizes for pose and audio packets since pose and audio packets may have constant, or close to constant, packet sizes with small variance but may not predict all uplink video traffic flows (e.g., may predict a subset of traffic flows). In some examples, a CG may be configured to be used by logical channels within an allowedCGList. The UE 115 may indicate in assistance information, or in capability information, that the UE 115 predicts a size of packets or bursts for one or more traffic flows (e.g., X traffic flows) from a set of traffic flows. If the CG is associated with logical channels through allowedCGList for the one or more traffic flows, then the UE 115 may indicate skipping for PUSCH occasions of the CG (e.g., indicate skipping for one or more PUSCH occasions corresponding to selected ones of the traffic flows).

In some examples, the UE 115 may indicate a timeline for which the UE 115 may be capable of indicating uplink skipping (e.g., can indicate the skipping x times before the skipped PUSCH). For example, the UE 115 may be capable of indicating the skipping indication 305 the duration 315 before the PUSCH occasion 310. The network entity 105 may respond with a verification of the duration 315 and may indicate that the duration 315 is a sufficient amount of time to reallocate the PUSCH occasion 310 to another UE. Accordingly, the network entity may enable or activate skipping for the PUSCH occasion 310. In other examples, the network entity 105 may indicate a timeline for the skipping indication 305 according to a capability of the network entity 105 to reallocate the PUSCH occasion 310. For example, the network entity may indicate that the network entity needs the skipping indication 305 a threshold amount of time (e.g., a minimum amount of time) before the PUSCH occasion 310 (e.g., can indicate that network entity 105 needs the skipping indication x times before the skipped PUSCH). The UE 115 may indicate that the UE 115 can support transmitting the skipping indication 305 satisfying the threshold amount of time, and the network entity 105 may enable or activate skipping for the PUSCH occasion 310. In some examples, the UE 115 may be included in a feature group (FG) of UEs, where the UEs in the FG support the feature of UE skipping of uplink (e.g., CG-PUSCH) occasions.

The UE 115 may indicate (e.g., via a UCI) that some PUSCH occasions (e.g., CG-PUSCH occasions) are unused and that some PUSCH occasions are used. In some cases, however, the UE 115 may skip an PUSCH occasion even if the UE 115 has indicated that it will use the PUSCH occasion beforehand in the UCI (e.g., legacy behavior of uplink skipping can be maintained). In some examples, a UE 115 that has a traffic awareness capability (e.g., can predict sizes of packets or bundles) may indicate that the PUSCH occasion 310 is used. In such examples, the network entity 105 may determine that the PUSCH occasion 310 will be used, may assume that it is unknown whether the PUSCH occasion 310 will be used, or may assume that the PUSCH occasion 310 will be used with at least some probability based on the UE 115 indicating that the UE 115 has the traffic awareness capability. The network entity 105 may make the determination based on whether the UE 115 can predict (e.g., fully predict) the traffic with confidence or based on whether the UE 115 can cancel an unused PUSCH occasion, or a combination thereof. In some examples, the UE 115 may indicate to the network entity a confidence level for estimating traffic and the network entity 105 may restrict reuse of the PUSCH occasion 310. Accordingly, the UE may skip the PUSCH occasion 310.

In some cases, in addition to or alternatively from transmitting a separate UE capability message, the UE 115 may utilize the UCI itself (e.g., the skipping indication 305). For example, the UE 115 may indicate a skipping state in the UCI for each of one or more PUSCH occasions (e.g., CG occasions) up to a maximum number of PUSCH occasions (e.g., Nmax). The skipping states corresponding to each PUSCH occasion may include skipped, not skipped, or not known yet at this time. In other examples, the skipping states may further include skipped unless otherwise indicated in a later UCI or not skipped unless otherwise indicated in a later UCI. In some examples, instead of the UE 115 sending UCI to skip or not skip (e.g., binary skip/no skip), the UE 115 may calculate (e.g., using AI, ML, a modulation and coding scheme (MCS), a number of resource blocks (RBs) of the CG) a remaining time that the UE 115 has in its buffer (e.g., uplink buffer). The UE 115 may transmit the UCI (e.g., the skipping indication 305) indicating the remaining time that the UE 115 will use an uplink channel (e.g., PUSCH, CG-PUSCH). The UE 115 may transmit an indication to update the indicated remaining time to the network entity 105 based on incoming traffic, changes to traffic flow, traffic flow characteristics, or any combination thereof. For example, the UE 115 may indicate an increase or decrease to the indicated remaining time each time the UE 115 transmits a UCI (e.g., a skipping indication 305). The network entity 105 may assume that when the indicated remaining time approaches zero, the PUSCH occasion 310 will be skipped.

The UE 115 may support uplink skipping for multi-transmission reception point (mTRP) deployments. The UE 115 may transmit a capability (e.g., mTRP-dynamic-CG-PUSCH-Skipping-Occasion-r18) via the capability information message or the UE assistance information to indicate that the UE 115 supports uplink skipping for mTRP. In some examples, the UE 115 may be able to indicate skipping over mTRP instead of skipping over a single transmission and reception point (TRP). In some examples, the UE 115 may be able to indicate (e.g., via the UE capability information message) whether it supports a second skipping field in the UCI (e.g., the skipping indication 305) for PUSCH occasions (e.g., CG-PUSCH occasions) if the UCI is a single UCI, where the second skipping field may correspond to a capability for skipping over mTRP. In some examples, the UE 115 may transmit in the UE capability message a joint indication indicating a capability for both single TRP and mTRP or separate indications for each of single TRP and mTRP.

Figure 4:
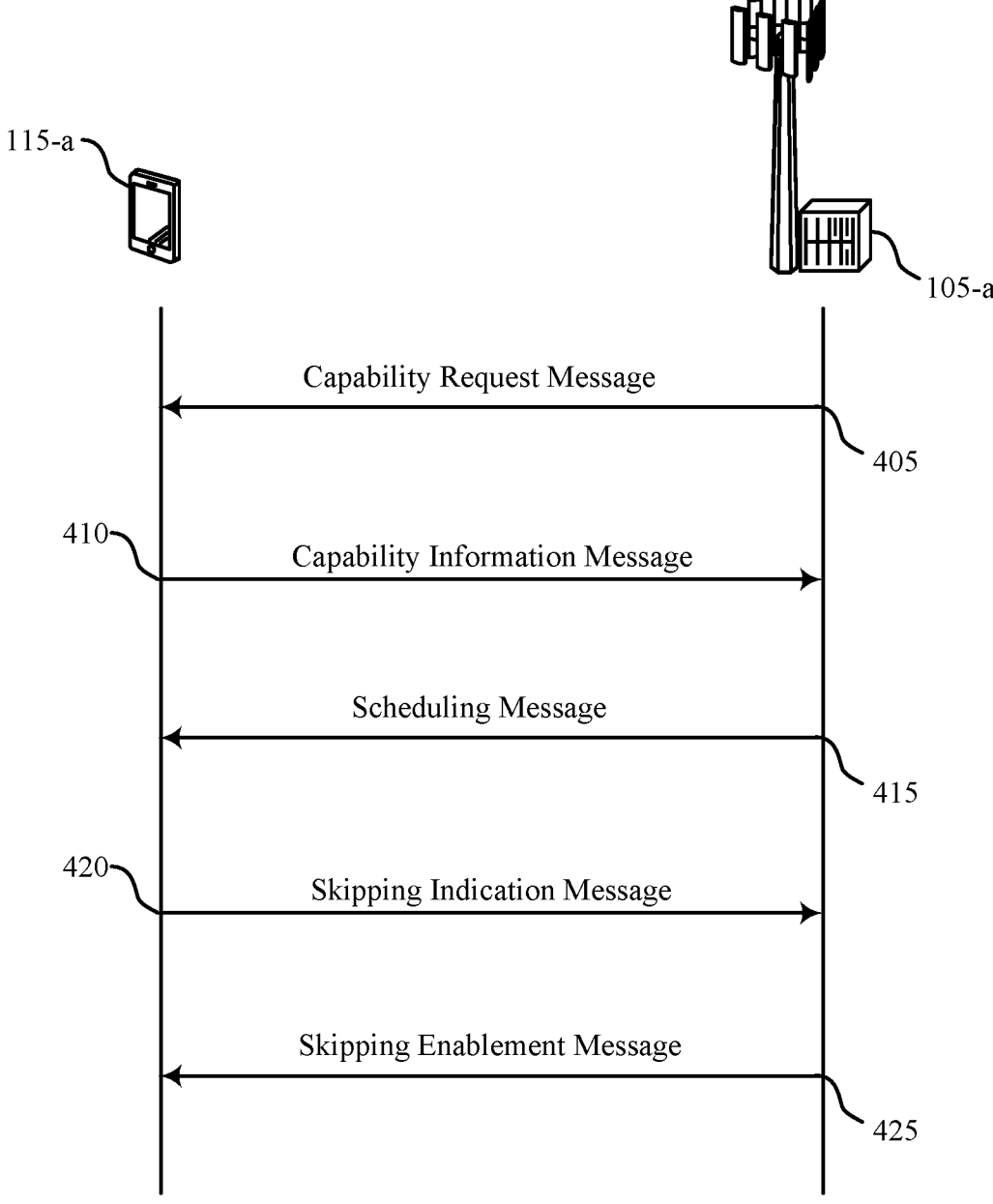
FIG. 4 shows an example of a process flow that supports capability information signaling for dynamic indication of shared channel occasion skipping in accordance with one or more aspects of the present disclosure.

FIG. 4 shows an example of a process flow 400 that supports capability information signaling for dynamic indication of shared channel occasion skipping in accordance with one or more aspects of the present disclosure. The process flow 400 may implement aspects or may be implemented by aspects of the wireless communications system 100, the configured uplink transmission scheme 200, or the timing diagram 300. For example, the process flow 400 may include a UE 115-*a* and a network entity 105-*a*, which may be examples of the corresponding devices as described with reference to FIG. 1. In the following description of the process flow 400, the operations between the UE 115-*a* and the network entity 105-*a* may be transmitted in a different order than the example order shown, or the operations performed by the UE 115-*a* and the network entity 105-*a* may be performed in different orders or at different times. Some operations may also be omitted from the process flow 400, and other operations may be added to the process flow 400.

At 405, the UE 115-*a* may receive a request message from the network entity 105-*a* for a timeline prior to a PUSCH occasion that the UE 115-*a* is capable of transmitting a PUSCH skipping indication. The request message may include an indication of multiple predictive accuracy values (probabilities), multiple candidate time values (e.g., time thresholds, timelines), or both. For example, the network entity 105-*a* may transmit the multiple predictive accuracy values and may request the UE 115-*a* for time thresholds corresponding to the multiple predictive accuracy values. In other examples, the network entity 105-*a* may transmit the multiple candidate time values and may request the UE 115-*a* for predictive accuracy values corresponding to the multiple candidate time values. In some examples, the request message may include a second timeline (e.g., a timeline of the network entity 105-*a*, TgNB) prior to the PUSCH occasion that the network entity 105-*a* is capable of reallocating the PUSCH occasion (e.g., reallocating resources for the PUSCH occasion). Additionally, or alternatively, the request message may include an indication of a list of CGs, and each CG of the list of CGs may include one or more PUSCH occasions and may correspond to a respective traffic flow, and the UE may respond to the request with multiple timelines, including the timeline, each timeline corresponding to one or more CGs of the CG list.

At 410, the UE 115-*a* may transmit a capability information message indicating a timeline prior to the PUSCH occasion that the UE 115-*a* is capable of transmitting the PUSCH skipping indication. The PUSCH skipping indication (e.g., at 420) may indicate that the UE 115-*a* is skipping uplink transmission in at least one PUSCH occasion (e.g., the first PUSCH occasion of a CG). The capability information message may be an RRC message, a UE assistance information, a MAC-CE, a UCI, or any combination thereof. In some examples, the capability information message may include an indication of a range of candidate time values, each candidate time value of the range of candidate time values corresponding to a respective procedure (e.g., mechanism, method) for obtaining an indication of the timeline. For example, the UE may obtain the indication of the timeline (e.g., traffic flow information) based on a PDU set size, burst size, statistic of a PDU set size, packet arrival time, uplink jitter, statistic of uplink jitter, timing information, or a combination thereof.

In some examples, the capability information message may include a predictive accuracy value (e.g., probability) corresponding to the timeline. The predictive accuracy value may correspond to a confidence level associated with the UE 115-*a* being capable of transmitting the PUSCH skipping indication at least at the timeline (e.g., a minimum amount of time, a threshold time, a time range) to a first PUSCH occasion. In some examples, the UE may report statistics of the timeline 315 (e.g., mean, variance, standard deviation, min, max, expectation of min or max, cumulative distribution function) via the capability information message. The UE 115-*a* may transmit a capability information update message indicating a second timeline different from the timeline. The capability information update message may indicate the second timeline (e.g., updated timeline) as a new timeline or may indicate a difference (e.g., delta update) for the second timeline with reference to the timeline.

In some cases, the capability information message may include an indication that the UE 115-*a* is capable of obtaining one or more types of uplink traffic information (e.g., uplink traffic flows), and the timeline may be based on the one or more types of uplink traffic information. For example, the UE may be capable of obtaining uplink traffic information (e.g., packet size) for one or more traffic flows (e.g., pose, audio), and the timeline may be based on the one or more traffic flows. In some examples, the UE 115-*a* may transmit, via the capability information message, a set of timelines including the timeline, each timeline of the set of timelines corresponding to CGs of a CG list (e.g., a preconfigured list, a list indicated by the network entity 105-*a*, an allowedCGList). In some cases, the capability information message may include an indication that the UE 115-*a* supports a feature of a feature group corresponding to the timeline. In some examples, the capability information message may include an indication that supports PUSCH skipping in an mTRP deployment.

At 415, the UE 115-*a* may receive signaling (e.g., from the network entity 105-*a*) indicating that the UE 115-*a* is scheduled with one or more PUSCH occasions. The signaling (e.g., scheduling message) may be RRC signaling (e.g., Type 2 CG), downlink control information (DCI), or other signaling. The scheduling may include a CG which may indicate a CG period or a CG group, where multiple PUSCH occasions belong to the CG period or the CG group. In some cases, the network entity 105-*a* may schedule the UE with uplink transmissions (e.g., PUSCH, CG-PUSCH), downlink transmissions (e.g., PDSCH, mTRP PDSCH), or any other transmissions.

At 420, the UE 115-*a* may transmit (e.g., to the network entity 105-*a*), at least at the indicated timeline to the first PUSCH occasion, a control message including the PUSCH skipping indication to indicate that the UE 115-*a* is skipping uplink transmission in the first PUSCH occasion. In some cases, the control message may include an indication of a skipping state corresponding to each of multiple PUSCH occasions including the first PUSCH occasion. For example, the UE 115-*a* may indicate that a second PUSCH occasion of the multiple PUSCH occasions is skipped, not skipped, or that a skipping status of the second PUSCH occasion is unknown, or conditional with reference to a potential later indication. In some examples, the control message may include an indication of a time period during with the UE 115-*a* will skip (e.g., or use) one or more PUSCH occasions including the first PUSCH occasion. The UE 115-*a* may calculate a remaining time associated with a buffer of the UE 115-*a*, and the time period may be based on the calculated remaining time. In some examples, the UE 115-*a* may skip the first PUSCH occasion (e.g., CG-PUSCH) even if the UE 115-*a* has indicated (e.g., in the skipping indication, UCI) that the UE 115-*a* will use the PUSCH occasion.

At 425, the UE 115-*a* may receive (e.g., from the network entity 105-*a*), control signaling indicating that skipping uplink transmission in at least one PUSCH occasion (e.g., the first PUSCH occasion in a burst) is enabled. In other cases, the UE 115-*a* may receive control signaling indicating that skipping uplink transmission in the at least one PUSCH occasion is disabled. The network entity 105-*a* may enable or disable a skipping indication for the UE 115-*a* based on a collective decision between the network entity 105-*a* and the UE 115-*a*.

Figure 5:
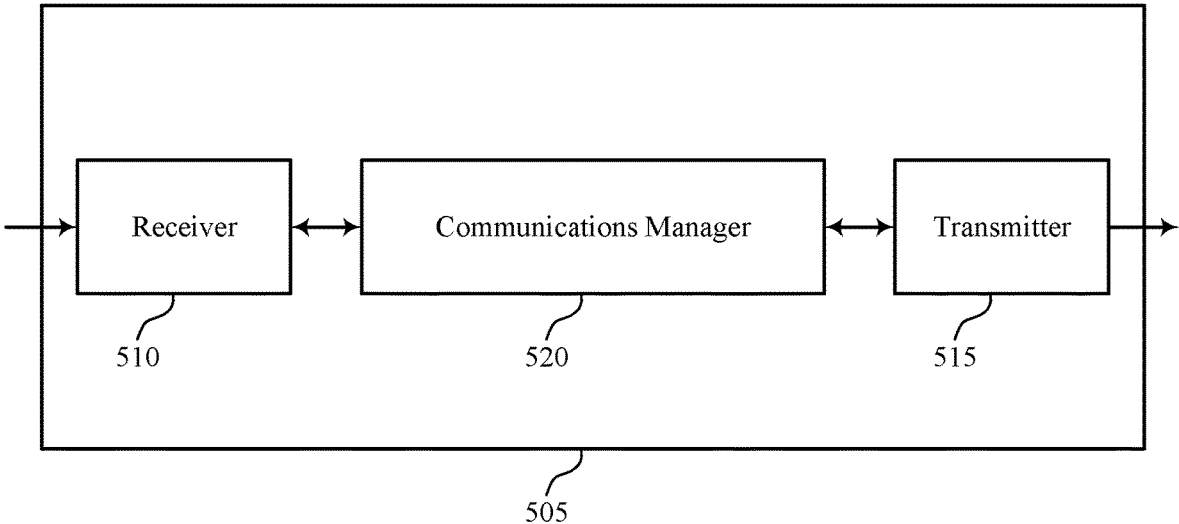
FIGS. 5 and 6 show block diagrams of devices that support capability information signaling for dynamic indication of shared channel occasion skipping in accordance with one or more aspects of the present disclosure.

FIG. 5 shows a block diagram 500 of a device 505 that supports capability information signaling for dynamic indication of shared channel occasion skipping in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to capability information signaling for dynamic indication of shared channel occasion skipping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to capability information signaling for dynamic indication of shared channel occasion skipping). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of capability information signaling for dynamic indication of shared channel occasion skipping as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion. The communications manager 520 is capable of, configured to, or operable to support a means for receiving signaling indicating that the UE is scheduled with one or more PUSCH occasions. The communications manager 520 is capable of, configured to, or operable to support a means for transmitting, at least at the timeline to a first PUSCH occasion, a control message including the PUSCH skipping indication to indicate that the UE is skipping uplink transmission in the first PUSCH occasion.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources and reduced resource waste. For example, the network entity 105 may enable skipping for the UE 115 and reallocate resources associated with a skipped PUSCH to another UE, thus making use of the resources that would otherwise be wasted. The device 505 may support reduced processing at the UE 115 by allowing the UE 115 to skip PUSCH occasions that are unused by the UE 115.

Figure 6:

FIG. 6 shows a block diagram 600 of a device 605 that supports capability information signaling for dynamic indication of shared channel occasion skipping in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to capability information signaling for dynamic indication of shared channel occasion skipping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to capability information signaling for dynamic indication of shared channel occasion skipping). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of capability information signaling for dynamic indication of shared channel occasion skipping as described herein. For example, the communications manager 620 may include a capability component 625, a scheduling component 630, a skipping component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The capability component 625 is capable of, configured to, or operable to support a means for transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion. The scheduling component 630 is capable of, configured to, or operable to support a means for receiving signaling indicating that the UE is scheduled with one or more PUSCH occasions. The skipping component 635 is capable of, configured to, or operable to support a means for transmitting, at least at the timeline to a first PUSCH occasion, a control message including the PUSCH skipping indication to indicate that the UE is skipping uplink transmission in the first PUSCH occasion.

Figure 7:
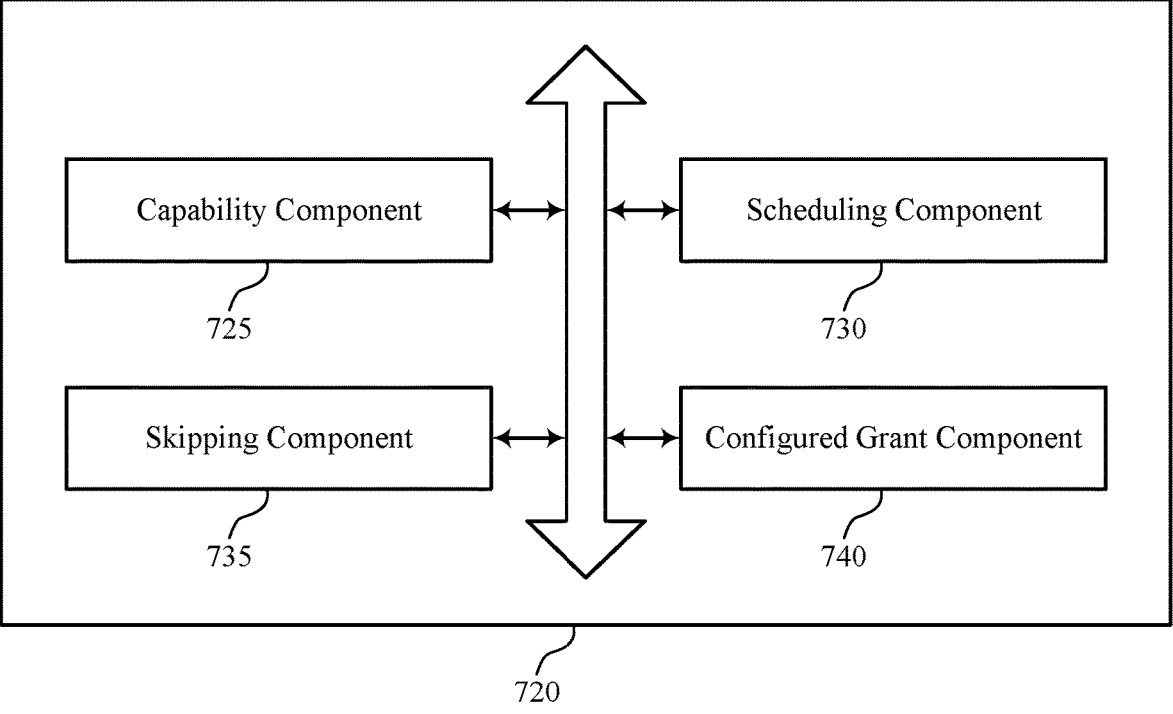
FIG. 7 shows a block diagram of a communications manager that supports capability information signaling for dynamic indication of shared channel occasion skipping in accordance with one or more aspects of the present disclosure.
Figure 7:

FIG. 7 shows a block diagram 700 of a communications manager 720 that supports capability information signaling for dynamic indication of shared channel occasion skipping in accordance with one or more aspects of the present disclosure. The communications manager 720 may be an example of aspects of a communications manager 520, a communications manager 620, or both, as described herein. The communications manager 720, or various components thereof, may be an example of means for performing various aspects of capability information signaling for dynamic indication of shared channel occasion skipping as described herein. For example, the communications manager 720 may include a capability component 725, a scheduling component 730, a skipping component 735, a CG component 740, or any combination thereof. Each of these components may communicate, directly or indirectly, with one another (e.g., via one or more buses).

The communications manager 720 may support wireless communications at a UE in accordance with examples as disclosed herein. The capability component 725 is capable of, configured to, or operable to support a means for transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion. The scheduling component 730 is capable of, configured to, or operable to support a means for receiving signaling indicating that the UE is scheduled with one or more PUSCH occasions. The skipping component 735 is capable of, configured to, or operable to support a means for transmitting, at least at the timeline to a first PUSCH occasion, a control message including the PUSCH skipping indication to indicate that the UE is skipping uplink transmission in the first PUSCH occasion.

In some examples, the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication.

In some examples, the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

In some examples, the capability component 725 is capable of, configured to, or operable to support a means for receiving control signaling including an indication of a set of predictive accuracy values including the predictive accuracy value, a set of candidate time values, or both, where the predictive accuracy value is based on receiving the control signaling.

In some examples, the capability information message includes an indication that the UE is capable of obtaining one or more types of uplink traffic information. In some examples, the timeline is based on at least one of the one or more types of uplink traffic information.

In some examples, the skipping component 735 is capable of, configured to, or operable to support a means for receiving control signaling indicating that skipping uplink transmission in at least the PUSCH occasion is enabled.

In some examples, the capability component 725 is capable of, configured to, or operable to support a means for transmitting a capability information update message indicating a second timeline different from the timeline. In some examples, the skipping component 735 is capable of, configured to, or operable to support a means for transmitting a second control message, at least at the second timeline to a second PUSCH occasion and based on the control signaling indicating that skipping uplink transmission in at least the PUSCH occasion is enabled, indicating that the UE will skip the second PUSCH occasion.

In some examples, the capability component 725 is capable of, configured to, or operable to support a means for receiving control signaling including an indication of a second timeline prior to the PUSCH occasion that a network entity is capable of reallocating the PUSCH occasion, where the capability information message includes an indication that the timeline satisfies the second timeline.

In some examples, the capability component 725 is capable of, configured to, or operable to support a means for receiving a request message from a network entity for the timeline, where the capability information message is based on receiving the request message.

In some examples, the CG component 740 is capable of, configured to, or operable to support a means for receiving control signaling indicating a list of CGs, each CG of the list of CGs including one or more PUSCH occasions and each CG of the list of CGs corresponding to a respective traffic flow of a set of multiple traffic flows, where the capability information message indicates a set of timelines including the timeline, each timeline of the set of timelines corresponding to one or more CGs of the list of CGs.

In some examples, the capability information message includes an indication that the UE supports a feature of a feature group corresponding to the timeline.

In some examples, the control message includes an indication of a skipping state corresponding to each of a set of multiple PUSCH occasions including the PUSCH occasion, the indication of the skipping state including an indication that a second PUSCH occasion is skipped, the second PUSCH occasion is not skipped, or that a skipping status of the second PUSCH occasion is unknown.

In some examples, the control message includes an indication of a time period during which the UE will skip one or more PUSCH occasions including the first PUSCH occasion.

In some examples, the capability information message includes an indication that the UE supports PUSCH skipping in a mTRP deployment.

Figure 8:
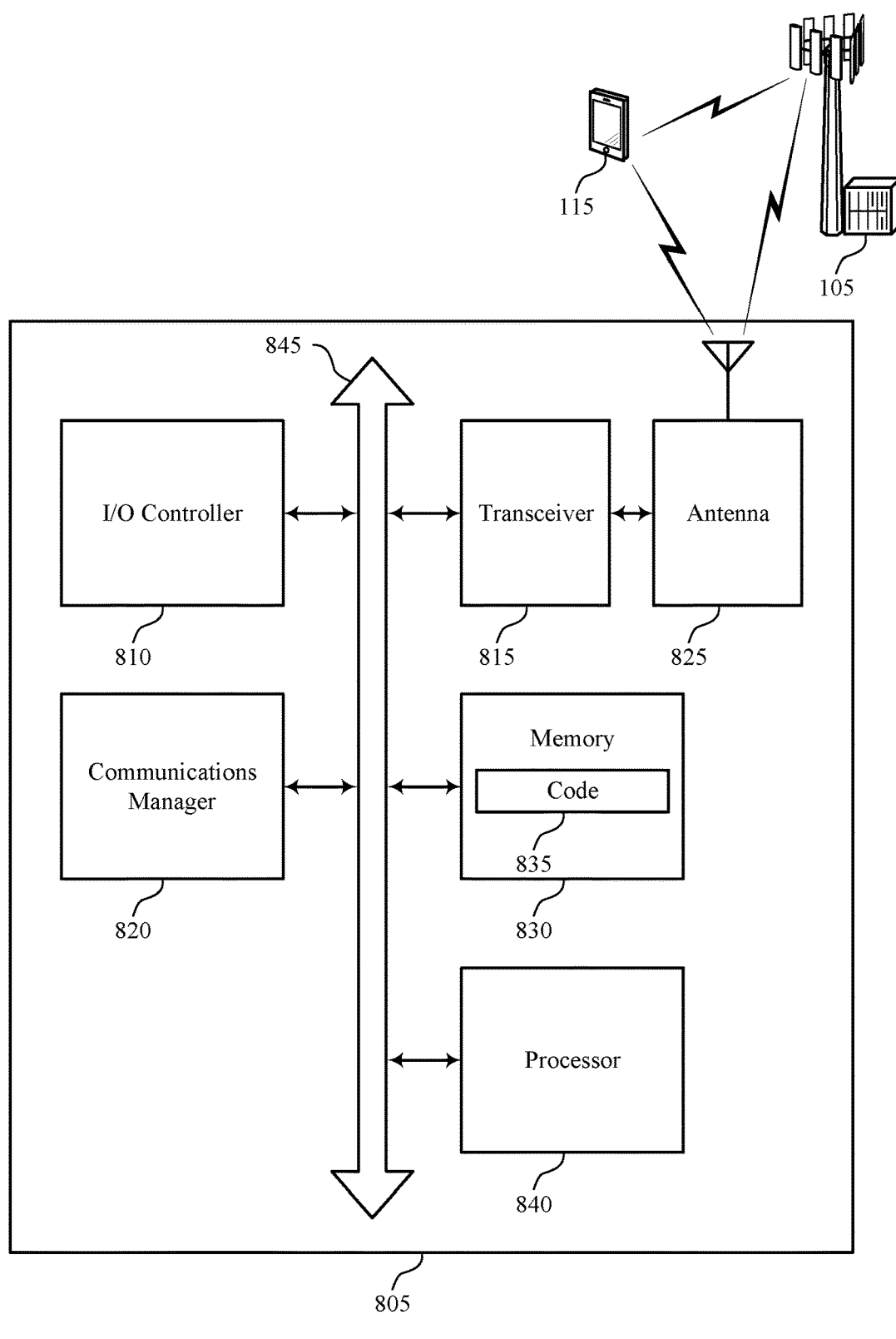
FIG. 8 shows a diagram of a system including a device that supports capability information signaling for dynamic indication of shared channel occasion skipping in accordance with one or more aspects of the present disclosure.

FIG. 8 shows a diagram of a system 800 including a device 805 that supports capability information signaling for dynamic indication of shared channel occasion skipping in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting capability information signaling for dynamic indication of shared channel occasion skipping). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion. The communications manager 820 is capable of, configured to, or operable to support a means for receiving signaling indicating that the UE is scheduled with one or more PUSCH occasions. The communications manager 820 is capable of, configured to, or operable to support a means for transmitting, at least at the timeline to a first PUSCH occasion, a control message including the PUSCH skipping indication to indicate that the UE is skipping uplink transmission in the first PUSCH occasion.

By including or configuring the communications manager 820 in accordance with examples as described herein, the device 805 may support techniques for improved coordination between devices by utilizing an indication between the UE 115 and the network entity 105 for which PUSCH occasions will be skipped in advance of the skipped PUSCH occasions. The device 805 may support reduced power consumption at the UE 115 by allowing the UE 115 to skip a greater number of PUSCH occasions, thus reducing wasted power at the UE due to PUSCH occasions going unused.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of capability information signaling for dynamic indication of shared channel occasion skipping as described herein, or the processor 840 and the memory 830 may be otherwise configured to perform or support such operations.

Figure 9:
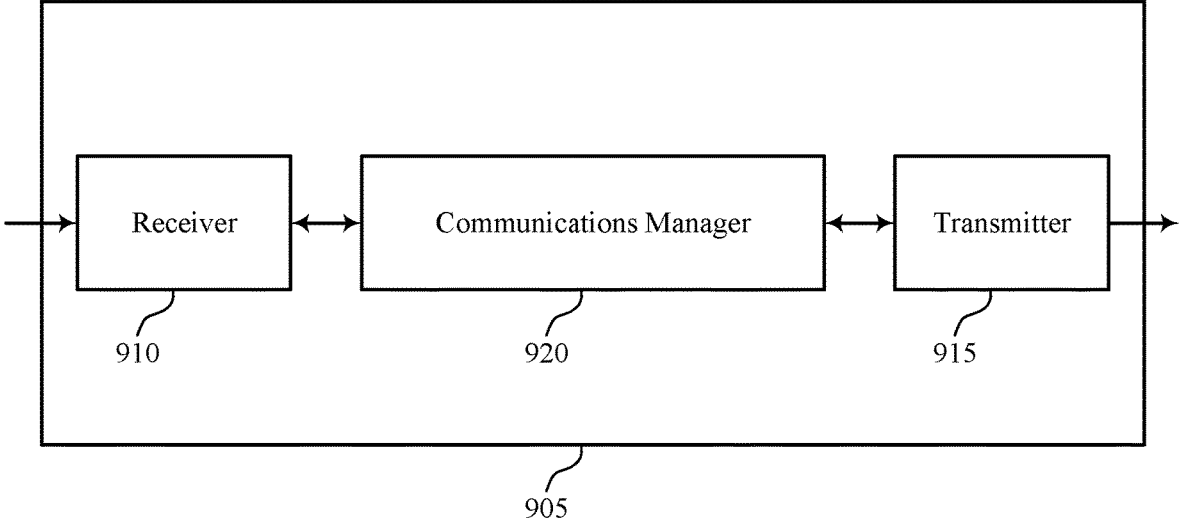
FIGS. 9 and 10 show block diagrams of devices that support capability information signaling for dynamic indication of shared channel occasion skipping in accordance with one or more aspects of the present disclosure.

FIG. 9 shows a block diagram 900 of a device 905 that supports capability information signaling for dynamic indication of shared channel occasion skipping in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of capability information signaling for dynamic indication of shared channel occasion skipping as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion. The communications manager 920 is capable of, configured to, or operable to support a means for transmitting signaling indicating that the UE is scheduled with one or more PUSCH occasions. The communications manager 920 is capable of, configured to, or operable to support a means for receiving, at least at the timeline to a first PUSCH occasion, a control message including the PUSCH skipping indication to indicate that the UE is skipping uplink transmission in the first PUSCH occasion.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources and reduced resource waste. For example, the network entity 105 may enable skipping for the UE 115 and reallocate resources associated with a skipped PUSCH to another UE, thus making use of the resources that would otherwise be wasted. The device 905 may support reduced processing at the UE 115 by allowing the UE 115 to skip PUSCH occasions that are unused by the UE 115.

Figure 10:
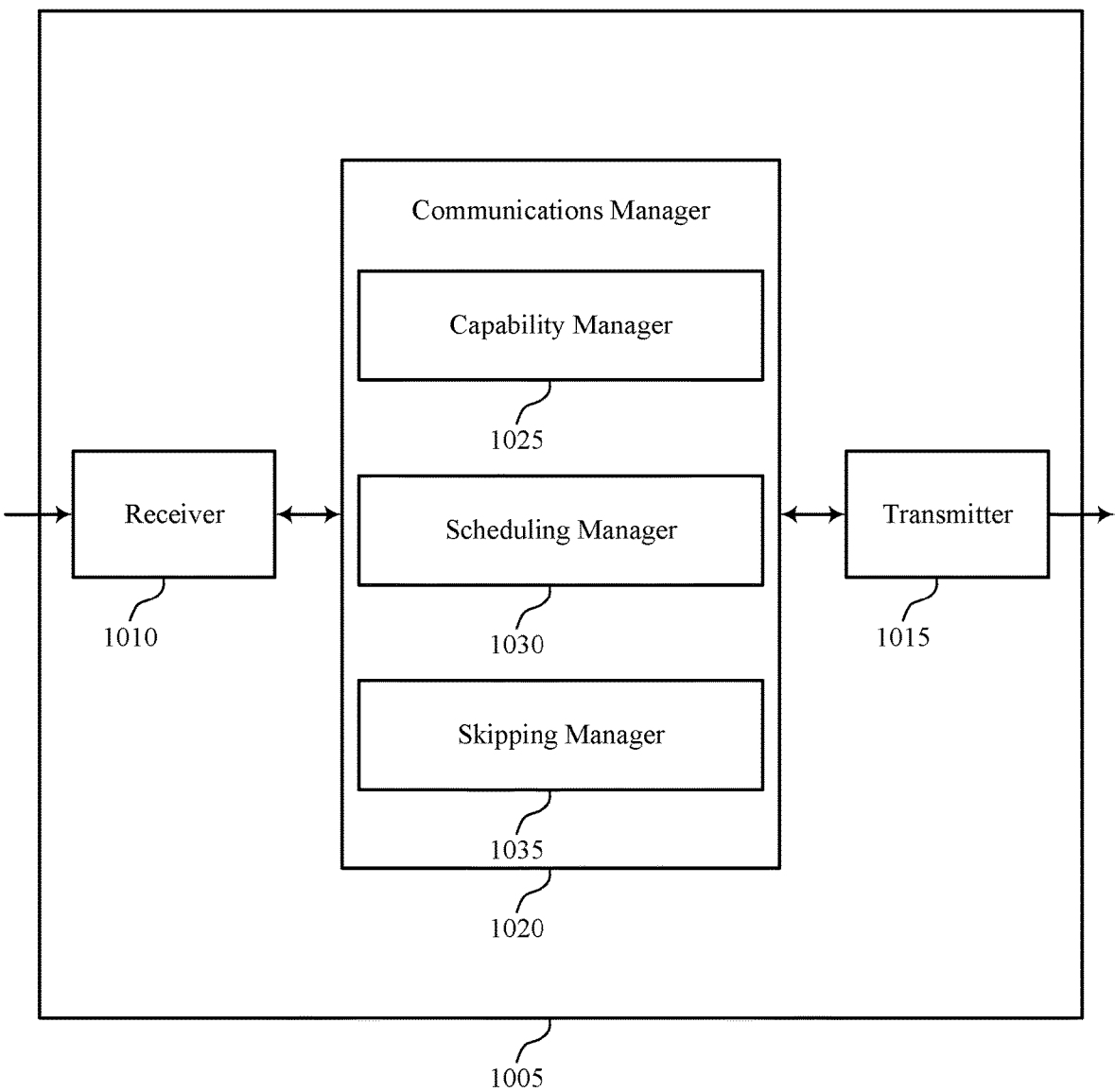

FIG. 10 shows a block diagram 1000 of a device 1005 that supports capability information signaling for dynamic indication of shared channel occasion skipping in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of capability information signaling for dynamic indication of shared channel occasion skipping as described herein. For example, the communications manager 1020 may include a capability manager 1025, a scheduling manager 1030, a skipping manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The capability manager 1025 is capable of, configured to, or operable to support a means for receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion. The scheduling manager 1030 is capable of, configured to, or operable to support a means for transmitting signaling indicating that the UE is scheduled with one or more PUSCH occasions. The skipping manager 1035 is capable of, configured to, or operable to support a means for receiving, at least at the timeline to a first PUSCH occasion, a control message including the PUSCH skipping indication to indicate that the UE is skipping uplink transmission in the first PUSCH occasion.

Figure 11:
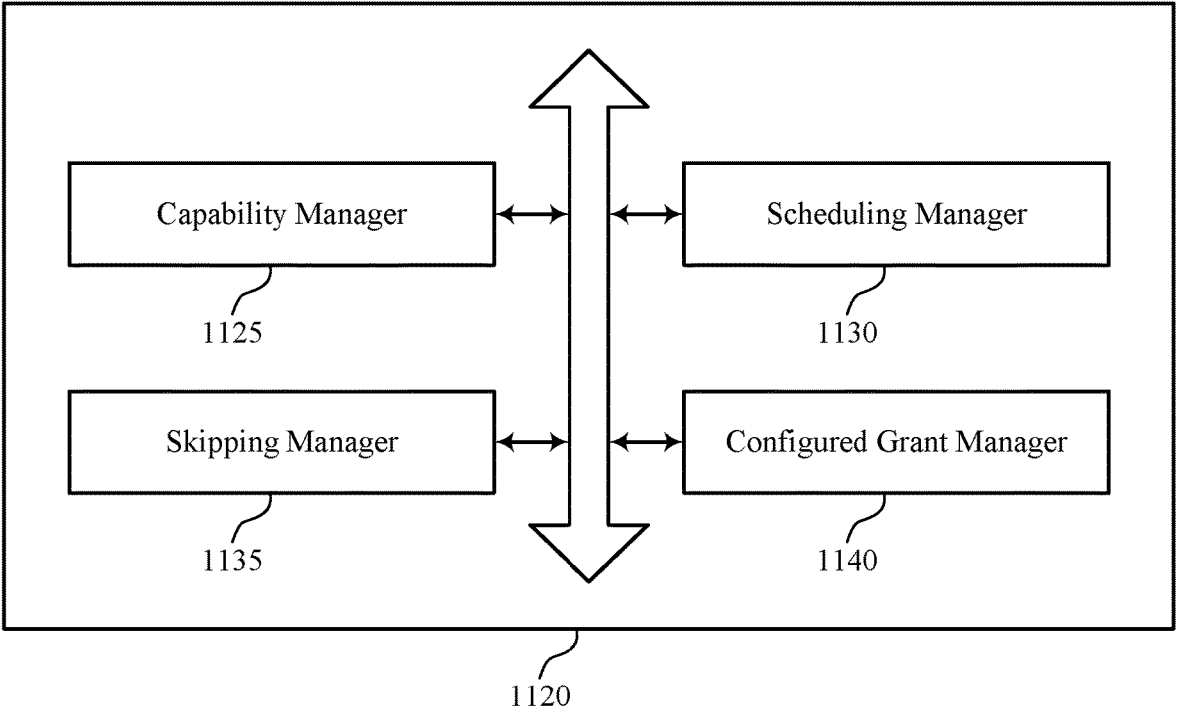
FIG. 11 shows a block diagram of a communications manager that supports capability information signaling for dynamic indication of shared channel occasion skipping in accordance with one or more aspects of the present disclosure.

FIG. 11 shows a block diagram 1100 of a communications manager 1120 that supports capability information signaling for dynamic indication of shared channel occasion skipping in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of capability information signaling for dynamic indication of shared channel occasion skipping as described herein. For example, the communications manager 1120 may include a capability manager 1125, a scheduling manager 1130, a skipping manager 1135, a CG manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The capability manager 1125 is capable of, configured to, or operable to support a means for receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion. The scheduling manager 1130 is capable of, configured to, or operable to support a means for transmitting signaling indicating that the UE is scheduled with one or more PUSCH occasions. The skipping manager 1135 is capable of, configured to, or operable to support a means for receiving, at least at the timeline to a first PUSCH occasion, a control message including the PUSCH skipping indication to indicate that the UE is skipping uplink transmission in the first PUSCH occasion.

In some examples, the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication.

In some examples, the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

In some examples, the capability manager 1125 is capable of, configured to, or operable to support a means for transmitting control signaling including an indication of a set of predictive accuracy values including the predictive accuracy value, a set of candidate time values, or both, where the predictive accuracy value is based on transmitting the control signaling.

In some examples, the capability information message includes an indication that the UE is capable of obtaining one or more types of uplink traffic information. In some examples, the timeline is based on at least one of the one or more types of uplink traffic information.

In some examples, the skipping manager 1135 is capable of, configured to, or operable to support a means for transmitting control signaling indicating that skipping uplink transmission in at least the PUSCH occasion is enabled.

In some examples, the capability manager 1125 is capable of, configured to, or operable to support a means for receiving a capability information update message indicating a second timeline different from the timeline. In some examples, the skipping manager 1135 is capable of, configured to, or operable to support a means for receiving a second control message, at least at the second timeline to a second PUSCH occasion and based on the control signaling indicating that skipping uplink transmission in at least the PUSCH occasion is enabled, indicating that the UE will skip the second PUSCH occasion.

In some examples, the capability manager 1125 is capable of, configured to, or operable to support a means for transmitting control signaling including an indication of a second timeline prior to the PUSCH occasion that the network entity is capable of reallocating the PUSCH occasion, where the capability information message includes an indication that the timeline satisfies the second timeline.

In some examples, the capability manager 1125 is capable of, configured to, or operable to support a means for transmitting a request message to the UE for the timeline, where the capability information message is based on transmitting the request message.

In some examples, the CG manager 1140 is capable of, configured to, or operable to support a means for transmitting control signaling indicating a list of CGs, each CG of the list of CGs including one or more PUSCH occasions and each CG of the list of CGs corresponding to a respective traffic flow of a set of multiple traffic flows, where the capability information message indicates a set of timelines including the timeline, each timeline of the set of timelines corresponding to one or more CGs of the list of CGs.

In some examples, the capability information message includes an indication that the UE supports a feature of a feature group corresponding to the timeline.

In some examples, the control message includes an indication of a skipping state corresponding to each of a set of multiple PUSCH occasions including the PUSCH occasion, the indication of the skipping state including an indication that a second PUSCH occasion is skipped, the second PUSCH occasion is not skipped, or that a skipping status of the second PUSCH occasion is unknown.

In some examples, the control message includes an indication of a time period during which the UE will skip one or more PUSCH occasions including the first PUSCH occasion.

In some examples, the capability information message includes an indication that the UE supports PUSCH skipping in a mTRP deployment.

FIG. 12 shows a diagram of a system 1200 including a device 1205 that supports capability information signaling for dynamic indication of shared channel occasion skipping in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting capability information signaling for dynamic indication of shared channel occasion skipping). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion. The communications manager 1220 is capable of, configured to, or operable to support a means for transmitting signaling indicating that the UE is scheduled with one or more PUSCH occasions. The communications manager 1220 is capable of, configured to, or operable to support a means for receiving, at least at the timeline to a first PUSCH occasion, a control message including the PUSCH skipping indication to indicate that the UE is skipping uplink transmission in the first PUSCH occasion.

By including or configuring the communications manager 1220 in accordance with examples as described herein, the device 1205 may support techniques for improved coordination between devices by utilizing an indication between the UE 115 and the network entity 105 for which PUSCH occasions will be skipped in advance of the skipped PUSCH occasions. The device 1205 may support reduced power consumption at the UE 115 by allowing the UE 115 to skip a greater number of PUSCH occasions, thus reducing wasted power at the UE due to PUSCH occasions going unused.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of capability information signaling for dynamic indication of shared channel occasion skipping as described herein, or the processor 1235 and the memory 1225 may be otherwise configured to perform or support such operations.

FIG. 13 shows a flowchart illustrating a method 1300 that supports capability information signaling for dynamic indication of shared channel occasion skipping in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion. The operations of 1305 may be performed in accordance with examples as disclosed herein. In some examples, aspects of the operations of 1305 may be performed by a capability component 725 as described with reference to FIG. 7.

At 1310, the method may include receiving signaling indicating that the UE is scheduled with one or more PUSCH occasions. The operations of 1310 may be performed in accordance with examples as disclosed herein. In some examples, aspects of the operations of 1310 may be performed by a scheduling component 730 as described with reference to FIG. 7.

At 1315, the method may include transmitting, at least at the timeline to a first PUSCH occasion, a control message including the PUSCH skipping indication to indicate that the UE is skipping uplink transmission in the first PUSCH occasion. The operations of 1315 may be performed in accordance with examples as disclosed herein. In some examples, aspects of the operations of 1315 may be performed by a skipping component 735 as described with reference to FIG. 7.

FIG. 14 shows a flowchart illustrating a method 1400 that supports capability information signaling for dynamic indication of shared channel occasion skipping in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, where the capability information includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication. The operations of 1405 may be performed in accordance with examples as disclosed herein. In some examples, aspects of the operations of 1405 may be performed by a capability component 725 as described with reference to FIG. 7.

At 1410, the method may include receiving signaling indicating that the UE is scheduled with one or more PUSCH occasions. The operations of 1410 may be performed in accordance with examples as disclosed herein. In some examples, aspects of the operations of 1410 may be performed by a scheduling component 730 as described with reference to FIG. 7.

At 1415, the method may include transmitting, at least at the timeline to a first PUSCH occasion, a control message including the PUSCH skipping indication to indicate that the UE is skipping uplink transmission in the first PUSCH occasion. The operations of 1415 may be performed in accordance with examples as disclosed herein. In some examples, aspects of the operations of 1415 may be performed by a skipping component 735 as described with reference to FIG. 7.

FIG. 15 shows a flowchart illustrating a method 1500 that supports capability information signaling for dynamic indication of shared channel occasion skipping in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1505, the method may include transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion, where the capability information indicates a predictive accuracy value corresponding to the timeline, the predictive accuracy value corresponding to a confidence level associated with the UE being capable of transmitting the PUSCH skipping indication at least at the timeline to the first PUSCH occasion. The operations of 1505 may be performed in accordance with examples as disclosed herein. In some examples, aspects of the operations of 1505 may be performed by a capability component 725 as described with reference to FIG. 7.

At 1510, the method may include receiving signaling indicating that the UE is scheduled with one or more PUSCH occasions. The operations of 1510 may be performed in accordance with examples as disclosed herein. In some examples, aspects of the operations of 1510 may be performed by a scheduling component 730 as described with reference to FIG. 7.

At 1515, the method may include transmitting, at least at the timeline to a first PUSCH occasion, a control message including the PUSCH skipping indication to indicate that the UE is skipping uplink transmission in the first PUSCH occasion. The operations of 1515 may be performed in accordance with examples as disclosed herein. In some examples, aspects of the operations of 1515 may be performed by a skipping component 735 as described with reference to FIG. 7.

FIG. 16 shows a flowchart illustrating a method 1600 that supports capability information signaling for dynamic indication of shared channel occasion skipping in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion. The operations of 1605 may be performed in accordance with examples as disclosed herein. In some examples, aspects of the operations of 1605 may be performed by a capability manager 1125 as described with reference to FIG. 11.

At 1610, the method may include transmitting signaling indicating that the UE is scheduled with one or more PUSCH occasions. The operations of 1610 may be performed in accordance with examples as disclosed herein. In some examples, aspects of the operations of 1610 may be performed by a scheduling manager 1130 as described with reference to FIG. 11.

At 1615, the method may include receiving, at least at the timeline to a first PUSCH occasion, a control message including the PUSCH skipping indication to indicate that the UE is skipping uplink transmission in the first PUSCH occasion. The operations of 1615 may be performed in accordance with examples as disclosed herein. In some examples, aspects of the operations of 1615 may be performed by a skipping manager 1135 as described with reference to FIG. 11.

FIG. 17 shows a flowchart illustrating a method 1700 that supports capability information signaling for dynamic indication of shared channel occasion skipping in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion, where the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication. The operations of 1705 may be performed in accordance with examples as disclosed herein. In some examples, aspects of the operations of 1705 may be performed by a capability manager 1125 as described with reference to FIG. 11.

At 1710, the method may include transmitting signaling indicating that the UE is scheduled with one or more PUSCH occasions. The operations of 1710 may be performed in accordance with examples as disclosed herein. In some examples, aspects of the operations of 1710 may be performed by a scheduling manager 1130 as described with reference to FIG. 11.

At 1715, the method may include receiving, at least at the timeline to a first PUSCH occasion, a control message including the PUSCH skipping indication to indicate that the UE is skipping uplink transmission in the first PUSCH occasion. The operations of 1715 may be performed in accordance with examples as disclosed herein. In some examples, aspects of the operations of 1715 may be performed by a skipping manager 1135 as described with reference to FIG. 11.

The following provides an overview of aspects of the present disclosure:

Aspect 1: A method for wireless communications at a UE, comprising: transmitting a capability information message indicating a timeline prior to a PUSCH occasion that the UE is capable of transmitting a PUSCH skipping indication, the PUSCH skipping indication indicating that the UE is skipping uplink transmission in at least one PUSCH occasion; receiving signaling indicating that the UE is scheduled with one or more PUSCH occasions; and transmitting, at least at the timeline to a first PUSCH occasion, a control message comprising the PUSCH skipping indication to indicate that the UE is skipping uplink transmission in the first PUSCH occasion.

Aspect 2: The method of aspect 1, wherein the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication.

Aspect 3: The method of any of aspects 1 through 2, wherein the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

Aspect 4: The method of aspect 3, further comprising: receiving control signaling comprising an indication of a set of predictive accuracy values comprising the predictive accuracy value, a set of candidate time values, or both, wherein the predictive accuracy value is based at least in part on receiving the control signaling.

Aspect 5: The method of any of aspects 1 through 4, wherein the capability information message includes an indication that the UE is capable of obtaining one or more types of uplink traffic information, where the timeline is based at least in part on at least one of the one or more types of uplink traffic information.

Aspect 6: The method of any of aspects 1 through 5, further comprising: receiving control signaling indicating that skipping uplink transmission in at least the PUSCH occasion is enabled.

Aspect 7: The method of aspect 6, further comprising: transmitting a capability information update message indicating a second timeline different from the timeline; and transmitting a second control message, at least at the second timeline to a second PUSCH occasion and based at least in part on the control signaling indicating that skipping uplink transmission in at least the PUSCH occasion is enabled, indicating that the UE will skip the second PUSCH occasion.

Aspect 8: The method of any of aspects 1 through 7, further comprising: receiving control signaling comprising an indication of a second timeline prior to the PUSCH occasion that a network entity is capable of reallocating the PUSCH occasion, wherein the capability information message comprises an indication that the timeline satisfies the second timeline.

Aspect 9: The method of any of aspects 1 through 8, further comprising: receiving a request message from a network entity for the timeline, wherein the capability information message is based at least in part on receiving the request message.

Aspect 10: The method of any of aspects 1 through 9, further comprising: receiving control signaling indicating a list of CGs, each CG of the list of CGs comprising one or more PUSCH occasions and each CG of the list of CGs corresponding to a respective traffic flow of a plurality of traffic flows, wherein the capability information message indicates a set of timelines comprising the timeline, each timeline of the set of timelines corresponding to one or more CGs of the list of CGs.

Aspect 11: The method of any of aspects 1 through 10, wherein the capability information message includes an indication that the UE supports a feature of a feature group corresponding to the timeline.

Aspect 12: The method of any of aspects 1 through 11, wherein the control message includes an indication of a skipping state corresponding to each of a plurality of PUSCH occasions comprising the PUSCH occasion, the indication of the skipping state comprising an indication that a second PUSCH occasion is skipped, the second PUSCH occasion is not skipped, or that a skipping status of the second PUSCH occasion is unknown.

Aspect 13: The method of any of aspects 1 through 12, wherein the control message includes an indication of a time period during which the UE will skip one or more PUSCH occasions comprising the first PUSCH occasion.

Aspect 14: The method of any of aspects 1 through 13, wherein the capability information message includes an indication that the UE supports PUSCH skipping in a mTRP deployment.

Aspect 15: A method for wireless communications at a network entity, comprising: receiving a capability information message indicating a timeline prior to a PUSCH occasion that a UE is capable of transmitting a PUSCH skipping indication, the PUSCH skipping indication indicating that the UE is skipping uplink transmission in at least one PUSCH occasion; transmitting signaling indicating that the UE is scheduled with one or more PUSCH occasions; and receiving, at least at the timeline to a first PUSCH occasion, a control message comprising the PUSCH skipping indication to indicate that the UE is skipping uplink transmission in the first PUSCH occasion.

Aspect 16: The method of aspect 15, wherein the capability information message includes an indication of a range of candidate time values, each candidate time value of the range of candidate time values corresponding to a respective procedure for obtaining an indication of the timeline prior to the first PUSCH occasion that the UE is capable of transmitting the PUSCH skipping indication.

Aspect 17: The method of any of aspects 15 through 16, wherein the capability information message indicates a predictive accuracy value corresponding to the timeline, the predictive accuracy value corresponding to a confidence level associated with the UE being capable of transmitting the PUSCH skipping indication at least at the timeline to the first PUSCH occasion.

Aspect 18: The method of aspect 17, further comprising: transmitting control signaling comprising an indication of a set of predictive accuracy values comprising the predictive accuracy value, a set of candidate time values, or both, wherein the predictive accuracy value is based at least in part on transmitting the control signaling.

Aspect 19: The method of any of aspects 15 through 18, wherein the capability information message includes an indication that the UE is capable of obtaining one or more types of uplink traffic information, the timeline is based at least in part on at least one of the one or more types of uplink traffic information.

Aspect 20: The method of any of aspects 15 through 19, further comprising: transmitting control signaling indicating that skipping uplink transmission in at least the PUSCH occasion is enabled.

Aspect 21: The method of aspect 20, further comprising: receiving a capability information update message indicating a second timeline different from the timeline; and receiving a second control message, at least at the second timeline to a second PUSCH occasion and based at least in part on the control signaling indicating that skipping uplink transmission in at least the PUSCH occasion is enabled, indicating that the UE will skip the second PUSCH occasion.

Aspect 22: The method of any of aspects 15 through 21, further comprising: transmitting control signaling comprising an indication of a second timeline prior to the PUSCH occasion that the network entity is capable of reallocating the PUSCH occasion, wherein the capability information message comprises an indication that the timeline satisfies the second timeline.

Aspect 23: The method of any of aspects 15 through 22, further comprising: transmitting a request message to the UE for the timeline, wherein the capability information message is based at least in part on transmitting the request message.

Aspect 24: The method of any of aspects 15 through 23, further comprising: transmitting control signaling indicating a list of CGs, each CG of the list of CGs comprising one or more PUSCH occasions and each CG of the list of CGs corresponding to a respective traffic flow of a plurality of traffic flows, wherein the capability information message indicates a set of timelines comprising the timeline, each timeline of the set of timelines corresponding to one or more CGs of the list of CGs.

Aspect 25: The method of any of aspects 15 through 24, wherein the capability information message includes an indication that the UE supports a feature of a feature group corresponding to the timeline.

Aspect 26: The method of any of aspects 15 through 25, wherein the control message includes an indication of a skipping state corresponding to each of a plurality of PUSCH occasions comprising the PUSCH occasion, the indication of the skipping state comprising an indication that a second PUSCH occasion is skipped, the second PUSCH occasion is not skipped, or that a skipping status of the second PUSCH occasion is unknown.

Aspect 27: The method of any of aspects 15 through 26, wherein the control message includes an indication of a time period during which the UE will skip one or more PUSCH occasions comprising the first PUSCH occasion.

Aspect 28: The method of any of aspects 15 through 27, wherein the capability information message includes an indication that the UE supports PUSCH skipping in a mTRP deployment.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      transmit a capability information message indicating a timeline prior to a physical uplink shared channel occasion that the UE is capable of transmitting a physical uplink shared channel skipping indication, the physical uplink shared channel skipping indication indicating that the UE is skipping uplink transmission in at least one physical uplink shared channel occasion;
      receive signaling indicating that the UE is scheduled with one or more physical uplink shared channel occasions; and transmit, at least at a duration prior to a first physical uplink shared channel occasion in accordance with the timeline, a control message comprising the physical uplink shared channel skipping indication to indicate that the UE is skipping uplink transmission in the first physical uplink shared channel occasion.

2. The apparatus of claim 1, wherein the capability information message includes an indication of a range of candidate time values, each candidate time value of the range of candidate time values corresponding to a respective procedure for obtaining an indication of the timeline prior to the first physical uplink shared channel occasion that the UE is capable of transmitting the physical uplink shared channel skipping indication.

3. The apparatus of claim 1, wherein the capability information message indicates a predictive accuracy value corresponding to the timeline, the predictive accuracy value corresponding to a confidence level associated with the UE being capable of transmitting the physical uplink shared channel skipping indication at least at the timeline to the first physical uplink shared channel occasion.

4. The apparatus of claim 3, wherein the instructions are further executable by the processor to cause the apparatus to:

receive control signaling comprising an indication of a set of predictive accuracy values comprising the predictive accuracy value, a set of candidate time values, or both, wherein the predictive accuracy value is based at least in part on receipt of the control signaling.

5. The apparatus of claim 1, wherein the capability information message includes an indication that the UE is capable of obtaining one or more types of uplink traffic information, wherein the timeline is based at least in part on at least one of the one or more types of uplink traffic information.

6. The apparatus of claim 1, wherein the instructions are further executable by the processor to cause the apparatus to:

receive control signaling indicating that skipping uplink transmission in at least the physical uplink shared channel occasion is enabled.

7. The apparatus of claim 6, wherein the instructions are further executable by the processor to cause the apparatus to:

transmit a capability information update message indicating a second timeline different from the timeline; and transmit a second control message, at least at the second timeline to a second physical uplink shared channel occasion and based at least in part on the control signaling indicating that skipping uplink transmission in at least the physical uplink shared channel occasion is enabled, indicating that the UE will skip the second physical uplink shared channel occasion.

8. The apparatus of claim 1, wherein the instructions are further executable by the processor to cause the apparatus to:

receive control signaling comprising an indication of a second timeline prior to the physical uplink shared channel occasion that a network entity is capable of reallocating the physical uplink shared channel occasion, wherein the capability information message comprises an indication that the timeline satisfies the second timeline.

9. The apparatus of claim 1, wherein the instructions are further executable by the processor to cause the apparatus to:

receive a request message from a network entity for the timeline, wherein the capability information message is based at least in part on receipt of the request message.

10. The apparatus of claim 1, wherein the instructions are further executable by the processor to cause the apparatus to:

receive control signaling indicating a list of configured grants, each configured grant of the list of configured grants comprising one or more physical uplink shared channel occasions and each configured grant of the list of configured grants corresponding to a respective traffic flow of a plurality of traffic flows, wherein the capability information message indicates a set of timelines comprising the timeline, each timeline of the set of timelines corresponding to one or more configured grants of the list of configured grants.

11. The apparatus of claim 1, wherein the capability information message includes an indication that the UE supports a feature of a feature group corresponding to the timeline.

12. The apparatus of claim 1, wherein the control message includes an indication of a skipping state corresponding to each of a plurality of physical uplink shared channel occasions comprising the physical uplink shared channel occasion, the indication of the skipping state comprising an indication that a second physical uplink shared channel occasion is skipped, the second physical uplink shared channel occasion is not skipped, or that a skipping status of the second physical uplink shared channel occasion is unknown.

13. The apparatus of claim 1, wherein the control message includes an indication of a time period during which the UE will skip one or more physical uplink shared channel occasions comprising the first physical uplink shared channel occasion.

14. The apparatus of claim 1, wherein the capability information message includes an indication that the UE supports physical uplink shared channel skipping in a multi-transmission reception point deployment.

15. An apparatus for wireless communications at a network entity, comprising:

a processor;

memory coupled with the processor; and instructions stored in the memory and executable by the processor to cause the apparatus to:

receive a capability information message indicating a timeline prior to a physical uplink shared channel occasion that a user equipment (UE) is capable of transmitting a physical uplink shared channel skipping indication, the physical uplink shared channel skipping indication indicating that the UE is skipping uplink transmission in at least one physical uplink shared channel occasion;

transmit signaling indicating that the UE is scheduled with one or more physical uplink shared channel occasions; and receive, at least at a duration prior to a first physical uplink shared channel occasion in accordance with the timeline, a control message comprising the physical uplink shared channel skipping indication to indicate that the UE is skipping uplink transmission in the first physical uplink shared channel occasion.

16. The apparatus of claim 15, wherein the capability information message includes an indication of a range of candidate time values, each candidate time value of the range of candidate time values corresponding to a respective procedure for obtaining an indication of the timeline prior to the first physical uplink shared channel occasion that the UE is capable of transmitting the physical uplink shared channel skipping indication.

17. The apparatus of claim 15, wherein the capability information message indicates a predictive accuracy value corresponding to the timeline, the predictive accuracy value corresponding to a confidence level associated with the UE being capable of transmitting the physical uplink shared channel skipping indication at least at the timeline to the first physical uplink shared channel occasion.

18. The apparatus of claim 17, wherein the instructions are further executable by the processor to cause the apparatus to:

transmit control signaling comprising an indication of a set of predictive accuracy values comprising the predictive accuracy value, a set of candidate time values, or both, wherein the predictive accuracy value is based at least in part on transmission of the control signaling.

19. The apparatus of claim 15, wherein the capability information message includes an indication that the UE is capable of obtaining one or more types of uplink traffic information, wherein the timeline is based at least in part on at least one of the one or more types of uplink traffic information.

20. The apparatus of claim 15, wherein the instructions are further executable by the processor to cause the apparatus to:

transmit control signaling indicating that skipping uplink transmission in at least the physical uplink shared channel occasion is enabled.

21. The apparatus of claim 20, wherein the instructions are further executable by the processor to cause the apparatus to:

receive a capability information update message indicating a second timeline different from the timeline; and receive a second control message, at least at the second timeline to a second physical uplink shared channel occasion and based at least in part on the control signaling indicating that skipping uplink transmission in at least the physical uplink shared channel occasion is enabled, indicating that the UE will skip the second physical uplink shared channel occasion.

22. The apparatus of claim 15, wherein the instructions are further executable by the processor to cause the apparatus to:

transmit control signaling comprising an indication of a second timeline prior to the physical uplink shared channel occasion that the network entity is capable of reallocating the physical uplink shared channel occasion, wherein the capability information message comprises an indication that the timeline satisfies the second timeline.

23. The apparatus of claim 15, wherein the instructions are further executable by the processor to cause the apparatus to:

transmit a request message to the UE for the timeline, wherein the capability information message is based at least in part on transmission of the request message.

24. The apparatus of claim 15, wherein the instructions are further executable by the processor to cause the apparatus to:

transmit control signaling indicating a list of configured grants, each configured grant of the list of configured grants comprising one or more physical uplink shared channel occasions and each configured grant of the list of configured grants corresponding to a respective traffic flow of a plurality of traffic flows, wherein the capability information message indicates a set of timelines comprising the timeline, each timeline of the set of timelines corresponding to one or more configured grants of the list of configured grants.

25. The apparatus of claim 15, wherein the capability information message includes an indication that the UE supports a feature of a feature group corresponding to the timeline.

26. The apparatus of claim 15, wherein the control message includes an indication of a skipping state corresponding to each of a plurality of physical uplink shared channel occasions comprising the physical uplink shared channel occasion, the indication of the skipping state comprising an indication that a second physical uplink shared channel occasion is skipped, the second physical uplink shared channel occasion is not skipped, or that a skipping status of the second physical uplink shared channel occasion is unknown.

27. The apparatus of claim 15, wherein the control message includes an indication of a time period during which the UE will skip one or more physical uplink shared channel occasions comprising the first physical uplink shared channel occasion.

28. The apparatus of claim 15, wherein the capability information message includes an indication that the UE supports physical uplink shared channel skipping in a multi-transmission reception point deployment.

29. A method for wireless communications at a user equipment (UE), comprising:

transmitting a capability information message indicating a timeline prior to a physical uplink shared channel occasion that the UE is capable of transmitting a physical uplink shared channel skipping indication, the physical uplink shared channel skipping indication indicating that the UE is skipping uplink transmission in at least one physical uplink shared channel occasion;

receiving signaling indicating that the UE is scheduled with one or more physical uplink shared channel occasions; and transmitting, at least at a duration prior to a first physical uplink shared channel occasion in accordance with the timeline, a control message comprising the physical uplink shared channel skipping indication to indicate that the UE is skipping uplink transmission in the first physical uplink shared channel occasion.

30. A method for wireless communications at a network entity, comprising:

receiving a capability information message indicating a timeline prior to a physical uplink shared channel occasion that a user equipment (UE) is capable of transmitting a physical uplink shared channel skipping indication, the physical uplink shared channel skipping indication indicating that the UE is skipping uplink transmission in at least one physical uplink shared channel occasion;

transmitting signaling indicating that the UE is scheduled with one or more physical uplink shared channel occasions; and receiving, at least at a duration prior to a first physical uplink shared channel occasion in accordance with the timeline, a control message comprising the physical uplink shared channel skipping indication to indicate that the UE is skipping uplink transmission in the first physical uplink shared channel occasion.

* * * * *